(12) United States Patent
Fukui et al.

(10) Patent No.: US 8,566,162 B2
(45) Date of Patent: Oct. 22, 2013

(54) INFORMATION DISTRIBUTION DEVICE, INFORMATION DISTRIBUTION METHOD, AND PROGRAM

(75) Inventors: Masayuki Fukui, Kawasaki (JP); Tatsuro Matsumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 463 days.

(21) Appl. No.: 12/895,180

(22) Filed: Sep. 30, 2010

(65) Prior Publication Data

US 2011/0022469 A1  Jan. 27, 2011

Related U.S. Application Data

(63) Continuation of application No. PCT/JP2008/056336, filed on Mar. 31, 2008.

(51) Int. Cl.
*G06Q 30/00* (2012.01)
(52) U.S. Cl.
USPC .................. 705/14.58; 705/14.41; 705/14.51; 705/14.57
(58) Field of Classification Search
USPC ....................................................... 705/14.58
See application file for complete search history.

(56) References Cited

U.S. PATENT DOCUMENTS

| 5,797,809 | A | * | 8/1998 | Hyuga | 473/407 |
|---|---|---|---|---|---|
| 2002/0143490 | A1 | | 10/2002 | Maeda et al. | |
| 2003/0179110 | A1 | | 9/2003 | Kato | |
| 2004/0127217 | A1 | | 7/2004 | Aoki et al. | |
| 2006/0149459 | A1 | | 7/2006 | Matsuura et al. | |
| 2010/0088407 | A1 | | 4/2010 | Fukui et al. | |

FOREIGN PATENT DOCUMENTS

| JP | 2000-155757 | 6/2000 |
|---|---|---|
| JP | 2001-350941 | 12/2001 |
| JP | 2003-30376 | 1/2003 |
| JP | 2003-122655 | 4/2003 |
| JP | 2003-196351 | 7/2003 |
| JP | 2003-284110 | 10/2003 |
| JP | 2004-96621 | 3/2004 |
| JP | 2005-18642 | 1/2005 |
| JP | 2005-345325 | 12/2005 |

(Continued)

OTHER PUBLICATIONS

International Search Report for PCT/JP2008/056336, mailed May 1, 2008.

*Primary Examiner* — John G Weiss
*Assistant Examiner* — Scott C Anderson
(74) *Attorney, Agent, or Firm* — Staas & Halsey LLP

(57) ABSTRACT

An information distribution device includes: a distribution information management table in which area information at the time of distribution indicating areas in which mobile terminals are located when advertising information is distributed from an information distributing part to the mobile terminals is recorded for each of the mobile terminals to which the advertising information is distributed from the information distribution part; a distribution area evaluation part that calculates, for each of a plurality of areas forming the distribution area and based on the area information at the time of distribution, an area visit probability indicating, of users of the mobile terminals who have been in any of the plurality of area forming the distribution area when the advertising information is distributed from the information distribution part, a percentage of those who have visited a location indicated by the advertising information; and a distribution area updating part that updates distribution area information recorded in a distribution area management table such that the distribution area only includes, of the plurality of areas, those whose area visit probability is equal to or larger than a threshold value.

6 Claims, 26 Drawing Sheets

(56) References Cited

FOREIGN PATENT DOCUMENTS

| | | |
|---|---|---|
| JP | 2006-60454 | 3/2006 |
| JP | 2007-156637 | 6/2007 |
| JP | 2007-293451 | 11/2007 |
| WO | 2004/075137 A1 | 9/2004 |
| WO | 2008/120361 A1 | 10/2008 |

* cited by examiner

| Area ID | Area range $(P_1 \text{latitude}, P_1 \text{longitude}) - (P_2 \text{latitude}, P_2 \text{longitude})$ |
|---|---|
| M0001 | (nnn. nn , nnn. nn) — (nnn. nn , nnn. nn) |
| M0002 | (nnn. nn , nnn. nn) — (nnn. nn , nnn. nn) |
| M0003 | (nnn. nn , nnn. nn) — (nnn. nn , nnn. nn) |
| ... | ... |
| M0016 | (nnn. nn , nnn. nn) — (nnn. nn , nnn. nn) |

FIG. 4

| Mobile terminal ID | Latitude information | Longitude information | Area ID | Last update time |
|---|---|---|---|---|
| A001 | nnn. nn | nnn. nn | M0002 | 2007/01/01 15:00:00 |
| A002 | nnn. nn | nnn. nn | M0003 | 2007/01/01 14:59:59 |
| A003 | nnn. nn | nnn. nn | M0003 | 2007/01/01 14:40:00 |
| A004 | nnn. nn | nnn. nn | M0004 | 2007/01/01 13:10:00 |
| A005 | nnn. nn | nnn. nn | M0005 | 2007/01/01 15:15:00 |
| A006 | nnn. nn | nnn. nn | M0005 | 2007/01/01 15:20:00 |
| ... | ... | ... | ... | ... |

FIG. 5

| Advertisement ID | Establishment ID | Advertisement text |
|---|---|---|
| A0001 | C0001 | Sandwiches are now on sale 10 % off ! |
| A0002 | G0001 | Save ¥2 on regular gasoline today ! |
| A0003 | C0002 | Buy liquor and get free snack! |
| ... | ... | ... |

FIG. 6

| Advertisement ID | Distribution area |
|---|---|
| A0001 | M0002, M0003, M0004, M0006, M0007, M0008, M0010, M0011, M0012 |
| A0002 | M0005, M0006, M0007, M0009, M0010, M0011 |
| A0003 | M0009, M0010, M0013, M0014 |
| ... | ... |

FIG. 7

| Mobile terminal ID | User name | E-mail address |
|---|---|---|
| A001 | Taro Yamada | a001@example.ne.jp |
| A002 | Jiro Yamada | a002@example.ne.jp |
| A003 | Saburo Yamada | a003@example.ne.jp |
| ... | ... | ... |

FIG. 8

From: info@example.co.jp

To: a001@example.ne.jp

Subject: From convenience store "AAA"

Please stop by at convenience store "AAA".
Sandwiches are now on sale 10 % off!

From: info@example. co.jp

To: a001@example. ne.jp

Subject: From gas station "CCC"

Please stop by at gas station 'CCC' and save ¥2 on regular gasoline today!

FIG. 10

| Establishment ID | Establishment type ID | Establishment name | Latitude information | Longitude information | Location range of establishment | Establishment address |
|---|---|---|---|---|---|---|
| C0001 | C1001 | AAA | nnn. nn | nnn. nn | 20 | 1st street, City A, prefecture B |
| G0001 | G1001 | CCC | nnn. nn | nnn. nn | 40 | 2nd street, City A, prefecture B |
| P0001 | P1001 | EEE | nnn. nn | nnn. nn | 30 | 3rd street, City A, prefecture B |
| C0002 | C1001 | GGG | nnn. nn | nnn. nn | 25 | 2nd street, City A, prefecture B |
| P0002 | P1001 | HHH | nnn. nn | nnn. nn | 50 | 3rd street, City A, prefecture B |
| ... | ... | ... | ... | ... | ... | ... |

FIG. 11

| Establishment type ID | Establishment type name | Stay determination time |
|---|---|---|
| C1001 | Convenience store | 300 |
| G1001 | Gas station | 300 |
| P1001 | Parking lot | 900 |
| ... | ... | ... |

FIG. 12

| Advertisement ID | Mobile terminal ID | Latitude information at the time of distribution | Longitude information at the time of distribution | Area ID at the time of distribution | Distribution time | Presence or absence of visits |
|---|---|---|---|---|---|---|
| A0001 | A001 | nnn.nn | nnn.nn | M0002 | 2007/03/01 12:00:00 | true |
| A0001 | A002 | nnn.nn | nnn.nn | M0003 | 2007/03/01 12:00:00 | true |
| A0001 | A003 | nnn.nn | nnn.nn | M0003 | 2007/03/01 12:00:00 | false |
| A0002 | A001 | nnn.nn | nnn.nn | M0005 | 2007/03/02 9:50:00 | true |
| A0002 | A002 | nnn.nn | nnn.nn | M0006 | 2007/03/02 9:50:00 | false |
| ... | ... | ... | ... | ... | ... | ... |

FIG. 13

| Advertisement ID | Area ID | Number of distributions of advertisements | Number of visits | Area visit probability |
|---|---|---|---|---|
| A0001 | M0002 | 120 | 30 | 25.0% |
| A0001 | M0003 | 200 | 80 | 40.0% |
| ... | ... | ... | ... | ... |
| A0002 | M0005 | 80 | 40 | 50.0% |
| A0002 | M0006 | 240 | 30 | 12.5% |
| ... | ... | ... | ... | ... |
| A0003 | M0009 | 10 | 2 | 20.0% |
| ... | ... | ... | ... | ... |

FIG. 14

| Mobile terminal ID | Latitude information | Longitude information | Travel direction | Area ID | Last update time |
|---|---|---|---|---|---|
| A001 | nnn.nn | nnn.nn | North | M0002 | 2007/01/01 15:00:00 |
| A002 | nnn.nn | nnn.nn | Northeast | M0003 | 2007/01/01 14:59:59 |
| A003 | nnn.nn | nnn.nn | East | M0003 | 2007/01/01 14:40:00 |
| A004 | nnn.nn | nnn.nn | South | M0004 | 2007/01/01 13:10:00 |
| A005 | nnn.nn | nnn.nn | Southwest | M0005 | 2007/01/01 15:15:00 |
| A006 | nnn.nn | nnn.nn | West | M0005 | 2007/01/01 15:20:00 |
| ... | ... | ... | ... | ... | ... |

FIG. 22

| Advertisement ID | Distribution area | Distribution direction |
|---|---|---|
| A0001 | M0002 | North, Northeast, East, Southeast, South, Southwest, West, Northwest |
| | M0003 | North, Northeast, East, Southeast, South, Southwest, West, Northwest |
| | M0004 | North, Northeast, East, Southeast, South, Southwest, West, Northwest |
| | M0006 | North, Northeast, East, Southeast, South, Southwest, West, Northwest |
| | M0007 | North, Northeast, East, Southeast, South, Southwest, West, Northwest |
| | M0008 | North, Northeast, East, Southeast, South, Southwest, West, Northwest |
| | M0010 | North, Northeast, East, Southeast, South, Southwest, West, Northwest |
| | M0011 | North, Northeast, East, Southeast, South, Southwest, West, Northwest |
| | M0012 | North, Northeast, East, Southeast, South, Southwest, West, Northwest |
| A0002 | M0005 | North, Northeast, East, Southeast, South, Southwest, West, Northwest |
| | M0006 | North, Northeast, East, Southeast, South, Southwest, West, Northwest |
| | M0007 | North, Northeast, East, Southeast, South, Southwest, West, Northwest |
| | M0009 | North, Northeast, East, Southeast, South, Southwest, West, Northwest |
| | M0010 | North, Northeast, East, Southeast, South, Southwest, West, Northwest |
| | M0011 | North, Northeast, East, Southeast, South, Southwest, West, Northwest |
| ... | ... | ... |

FIG. 23

| Advertisement ID | Mobile terminal ID | Latitude information at the time of distribution | Longitude information at the time of distribution | Terminal direction information at the time of distribution | Area ID at the time of distribution | Distribution time | Presence or absence of visits |
|---|---|---|---|---|---|---|---|
| A0001 | A001 | nnn.nn | nnn.nn | North | M0002 | 2007/03/01 12:00:00 | true |
| A0001 | A002 | nnn.nn | nnn.nn | Northeast | M0003 | 2007/03/01 12:00:00 | true |
| A0001 | A003 | nnn.nn | nnn.nn | East | M0003 | 2007/03/01 12:00:00 | false |
| A0002 | A001 | nnn.nn | nnn.nn | North | M0005 | 2007/03/02 9:50:00 | true |
| A0002 | A002 | nnn.nn | nnn.nn | Northeast | M0006 | 2007/03/02 9:50:00 | false |
| ... | ... | ... | ... | ... | ... | ... | ... |

FIG. 24

| Advertisement ID | Area ID | Number of distributions of advertisements (area) | Number of visits (area) | Area visit probability | Direction | Number of distributions of advertisements (direction) | Number of visits (direction) | Direction visit probability |
|---|---|---|---|---|---|---|---|---|
| A0001 | M00 02 | 120 | 30 | 25.0% | North | 30 | 15 | 50.0% |
| | | | | | Northeast | 12 | 4 | 33.3% |
| | | | | | East | 16 | 4 | 25.0% |
| | | | | | Southeast | 10 | 2 | 20.0% |
| | | | | | South | 14 | 1 | 7.1% |
| | | | | | Southwest | 20 | 0 | 0.0% |
| | | | | | West | 8 | 1 | 12.5% |
| | | | | | Northwest | 10 | 3 | 30.0% |
| | M00 03 | 200 | 80 | 40.0% | North | 20 | 10 | 50.0% |
| | | | | | Northeast | 40 | 22 | 55.0% |
| | | | | | East | 25 | 15 | 60.0% |
| | | | | | Southeast | 10 | 2 | 20.0% |
| | | | | | South | 15 | 3 | 20.0% |
| | | | | | Southwest | 30 | 6 | 20.0% |
| | | | | | West | 42 | 20 | 47.6% |
| | | | | | Northwest | 18 | 2 | 11.1% |
| ⋮ | ⋮ | ⋮ | ⋮ | ⋮ | ⋮ | ⋮ | ⋮ | ⋮ |

75

FIG. 25

INFORMATION DISTRIBUTION DEVICE, INFORMATION DISTRIBUTION METHOD, AND PROGRAM

CROSS-REFERENCE TO RELATED APPLICATION

This application is a continuation application under 35 U.S.C.§111(a) of international application No. PCT/JP2008/056336, filed on Mar. 31, 2008, the entire contents of which are incorporated herein by reference.

FIELD

The present invention relates to an information distribution device, an information distribution method and a program for distributing notification information regarding a predetermined location to mobile terminals located within the distribution area.

BACKGROUND

In order to increase sales of products in which a variety of establishments deal, the following technique has been known in recent years. By pre-recording in an information distribution device advertising information indicating an advertisement for products of an establishment, the information distribution device distributes the advertising information (notification information) via a network to portable terminals (mobile terminals) owned by an indefinite number of users at the same time (see Japanese Laid-open Patent Publication No. 2001-350941, for example). For example, such an information distribution device determines whether to distribute the advertising information or not in accordance with the current locations of users' portable terminals. Specifically, the information distribution device distributes the advertising information to portable terminals located within a certain range of the establishment dealing in the advertised products (e.g., within a 10-km radius of the establishment). That is, the area within the certain range of the establishment is set as the distribution area.

However, when the distribution area covers a wide range, the advertising information is also distributed to portable terminals owned by users who absolutely have nothing to do with the establishment, for example, those who are far away from the establishment. In other words, when the distribution area covers a wide range, advertising information unnecessary to a large number of users is distributed to their portable terminals. As a result, the advertising expenses (communications expenses) borne by the proprietor of the establishment increase. Also, it is very bothersome for the portable terminal users because unnecessary advertising information is distributed to them.

In order to solve such a problem, there has been proposed an information distribution device that confines the distribution area and distributes advertising information only to users' portable terminals located in the vicinity of the establishment (e.g., within a 500-m radius of the establishment) (see Japanese Laid-open Patent Publication No. 2005-345325, for example). However, contrary to the problem described above, when the distribution area is confined, the advertising information may not be distributed to users who wish to receive the advertising information with their portable terminals. This can result in a reduction of the advertising expenses but the sales of products (profit of the establishment) do not rise more than a certain amount.

For this reason, there has been proposed an information distribution device that dynamically changes the distribution area in accordance with whether or not portable terminal users have read advertising information distributed to them (see Japanese Laid-open Patent Publication No. 2006-60454, for example). Specifically, the information distribution device expands the distribution area when there are a large number of users who have read the advertising information and narrows the distribution area when there are only a small number of users who have read the advertising information. Consequently, it is possible to reduce the advertising expenses while ensuring the profit of the establishment to be more than a certain amount as compared with the forms with a fixed distribution area.

However, since the conventional information distribution devices described above each set the area within a certain range of an establishment as the distribution area, problems such as the following occur even if the distribution area is changed dynamically as in the described-above case.

As an example, it is assumed that an establishment is located on a main line running in an east-west direction. In this case, since portable terminal users on the main line in the east-west direction are accessible to the main line, they are likely to visit the establishment if advertising information regarding the establishment is distributed to their portable terminals. In contrast, users located in the north-south direction with respect to the main line are not accessible to the main line. Thus, they are less likely to visit the establishment even if the advertising information is distributed to their portable terminals.

For this reason, when the advertising information is distributed to portable terminals located within a certain range of the establishment in a uniform manner as in the conventional information distribution devices described above, the advertising information may be beneficial to the users located on the main line in the east-west direction but be useless to those located in the north-south direction with respect to the main line. In other words, since the area within a certain range of the establishment is set as the distribution area, even if the distribution area is changed dynamically, advertising information unnecessary to a large number of users is distributed to their portable terminals.

SUMMARY

According to an aspect of the invention, the information distribution device includes: a terminal location retrieving part that retrieves terminal location information indicating current locations of mobile terminals; a notification information recording part in which notification information regarding a predetermined location is pre-recorded; a distribution area recording part in which distribution area information indicating a distribution area formed of a plurality of areas is recorded; an information distribution part that distributes the notification information to, of the mobile terminals, those located within the distribution area; a distribution information recording part, wherein recorded in the distribution information recording part is area information at a time of distribution indicating areas in which the mobile terminals are located when the notification information is distributed from the information distribution part to the mobile terminals, and the area information at the time of distribution is recorded for each of the mobile terminals to which the notification information is distributed from the information distribution part; a distribution area evaluation part that calculates, for each of the plurality of areas forming the distribution area and based on the area information at the time of distribution, an area visit evaluation value indicating, of users of the mobile terminals who have been in any of the plurality of areas forming the distribution area when the notification information is distributed from the information distribution part, a percentage of those who have visited the location indicated by the notification information; and a distribution area updating part that updates the distribution area information recorded in the distribution area recording part such that the distribution area only includes, of the plurality areas, those whose area visit evaluation value is equal to or larger than a threshold value.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

As described above, the information distribution device, the information distribution method and the program of the present invention can reduce the number of distributions of notification information unnecessary to the users of the portable terminals.

BRIEF DESCRIPTION OF THE DRAWING(S)

FIG. 4 is a diagram illustrating one example of data recorded in an area management table of the information distribution device.

FIG. 5 is a diagram illustrating one example of data recorded in a terminal location management table of the information distribution device.

FIG. 6 is a diagram illustrating one example of data recorded in an advertising information management table of the information distribution device.

FIG. 7 is a diagram illustrating one example of data recorded in a distribution area management table of the information distribution device.

FIG. 8 is a diagram illustrating one example of data recorded in a user information management table of the information distribution device.

FIG. 9 is a conceptual diagram illustrating one example of advertising information displayed on a display part of a mobile terminal of the distribution system.

FIG. 10 is a conceptual diagram illustrating another example of the advertising information displayed on the display part of the mobile terminal.

FIG. 11 is a diagram illustrating one example of data recorded in an establishment information management table of the information distribution device.

FIG. 12 is a diagram illustrating one example of data recorded in a stay determination time management table of the information distribution device.

FIG. 13 is a diagram illustrating one example of data recorded in a distribution information management table of the information distribution device.

FIG. 14 is a diagram illustrating one example of data recorded in a visit trend management table of the information distribution device.

FIG. 22 is a diagram illustrating one example of data recorded in a terminal location management table of the information distribution device.

FIG. 23 is a diagram illustrating one example of data recorded in a distribution management table of the information distribution device.

FIG. 24 is a diagram illustrating one example of data recorded in a distribution information management table of the information distribution device.

FIG. 25 is a diagram illustrating one example of data recorded in a visit trend management table of the information distribution device.

Figure 29:
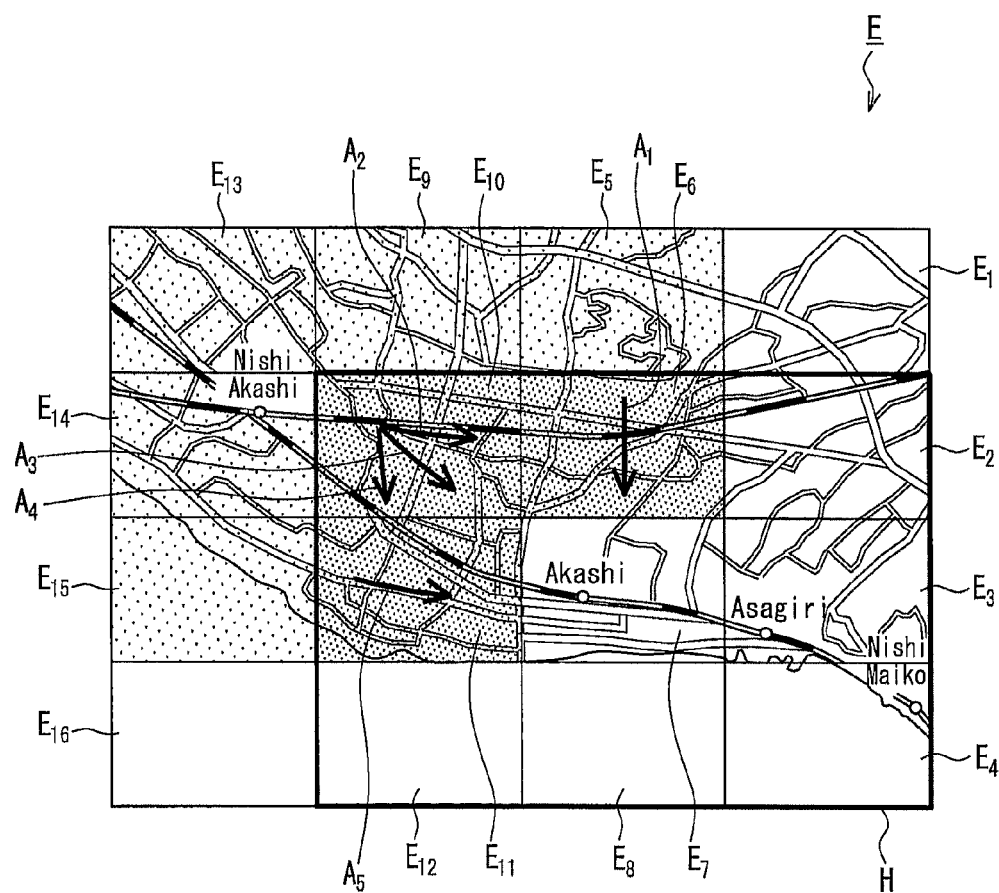

FIG. 29 is a schematic diagram for explaining the relationship between the distribution area and, of areas that are in the vicinity of areas whose area visit probability is equal to or larger than a threshold value and are in directions opposite to directions whose direction visit probability is equal to or larger than a threshold value in the areas whose area visit probability is equal to or larger than a threshold value, those whose area visit probability is not calculated by a distribution area evaluation part.

DESCRIPTION OF EMBODIMENT(S)

According to the information distribution device of the present invention, the distribution area evaluation part calculates, for each of the plurality of areas forming the distribution area and based on the area information at the time of distribution, an area visit evaluation value indicating, of the users of the mobile terminals who have been in any of the plurality of areas forming the distribution area when the notification information is distributed from the information distribution part, a percentage of those who have visited the location indicated by the notification information. Here, the area information at the time of distribution indicates areas in which the mobile terminals are located when the notification information is distributed from the information distribution part to the mobile terminals. The distribution area updating part updates the distribution area information recorded in the distribution area recording part such that the distribution area only includes, of the plurality of areas, those whose area visit evaluation value is equal to or larger than a threshold value. In other words, the areas whose area visit probability is less than the threshold value are removed from the distribution area. Thus, the information distribution part can distribute the notification information only to the mobile terminals located within the areas whose area visit probability is equal to or larger than the threshold value. As a result, the information distribution device according to the present invention can reduce the number of distributions of the notification information unnecessary to the users of the mobile terminals.

According to an aspect of the invention, the information distribution method is executed by a computer including a notification information recording part in which notification information regarding a predetermined location is pre-recorded and a distribution area recording part in which distribution area information indicating a distribution area formed of a plurality of areas is recorded. The information distribution method includes: retrieving, by a terminal location retrieving part included in the computer, terminal location information indicating current locations of mobile terminals; distributing, by an information distribution part included in the computer, the notification information to, of the mobile terminals, those located within the distribution area; calculating, by a distribution area evaluation part included in the computer and for each of the plurality of areas forming the distribution area, an area visit evaluation value indicating, of users of the mobile terminals who have been in any of the plurality of areas forming the distribution area when the notification information is distributed, a percentage of those who have visited the location indicated by the notification information based on area information at a time of distribution indicating areas in which the mobile terminals are located when the notification information is distributed and recorded in a distribution information recording part for each of the mobile terminals to which the notification information is distributed; and updating, by a distribution area updating part included in the computer, the distribution area information recorded in the distribution area recording part such that the distribution area only includes, of the plurality areas, those whose area visit evaluation value is equal to or larger than a threshold value.

According to an aspect of the invention, the program is a program for causing a computer including a notification information recording part in which notification information regarding a predetermined location is pre-recorded and a distribution area recording part in which distribution area information indicating a distribution area formed of a plurality of areas is recorded to perform processing of retrieving terminal location information indicating current locations of mobile terminals; distributing the notification information to, of the mobile terminals, those located within the distribution area; calculating, for each of the plurality of areas forming the distribution area, an area visit evaluation value indicating, of users of the mobile terminals who have been in any of the plurality of areas forming the distribution area when the notification information is distributed, a percentage of those who have visited the location indicated by the notification information based on area information at a time of distribution indicating areas in which the mobile terminals are located when the notification information is distributed and recorded in a distribution information recording part for each of the mobile terminals to which the notification information is distributed; and updating the distribution area information recorded in the distribution area recording part such that the distribution area only includes, of the plurality areas, those whose area visit evaluation value is equal to or larger than a threshold value. The information distribution method and program of the present invention provide the same effects as those of the information distribution device.

According to an aspect of the invention, it is preferable that the distribution area updating part updates the distribution area information recorded in the distribution area recording part such that the distribution area also includes, of areas in the vicinity of the areas whose area visit evaluation value is equal to or larger than the threshold value, those whose area visit evaluation value is not calculated by the distribution area evaluation part.

Here, it is likely that areas in the vicinity of the areas whose area visit evaluation value is equal to or larger than the threshold value also have an area visit evaluation value equal to or larger than the threshold value. Thus, according to this configuration, the distribution area updating part updates the distribution area information such that the distribution area also includes, of areas in the vicinity of the areas whose area visit evaluation value is equal to or larger than the threshold value, those whose area visit evaluation value is not calculated by the distribution area evaluation part. Consequently, the information distribution part can distribute the notification information also to the mobile terminals located within, of areas in the vicinity of the areas whose area visit evaluation value is equal to or larger than the threshold value, those whose area visit evaluation value is not calculated by the distribution area evaluation part.

According to an aspect of the invention, it is preferable that the information distribution device further includes a terminal direction retrieving part that retrieves terminal direction information indicating directions in which the mobile terminals travel, distribution direction information indicating directions is recorded in the distribution area recording part for each of the plurality of areas forming the distribution area, the information distribution part distributes the notification information to, of the mobile terminals, those located within any of the plurality of areas forming the distribution area and traveling in the directions indicated by the distribution direction information, further recorded in the distribution information recording part is terminal direction information at a time of distribution obtained from the terminal direction information and indicating directions in which the mobile terminals travel when the notification information is distributed from the information distribution part to the mobile terminals, and the terminal direction information at the time of distribution is recorded for each of the mobile terminals to which the notification information is distributed from the information distribution part, the distribution area evaluation part calculates, for each of a plurality of predetermined directions in each of the plurality of areas forming the distribution area and based on the terminal direction information at the time of distribution, a direction visit evaluation value indicating, of users of the mobile terminals who have been traveling in any one of the plurality of directions in any one of the plurality of areas when the notification information is distributed from the information distribution part, a percentage of those who have visited the location indicated by the notification information, and the distribution area updating part updates the distribution direction information recorded in the distribution area recording part such that the notification information is distributed only to the mobile terminals traveling in, of the plurality of directions, those whose direction visit probability is equal to or larger than a threshold value in the areas whose area visit probability is equal to or larger than the threshold value.

According to this configuration, the notification information is not distributed to the mobile terminals traveling in the directions whose direction visit evaluation value is less than the threshold value even when they are within the areas whose area visit probability is equal to or larger than the threshold value. In other words, the information distribution part can distribute the notification information only to the mobile terminals traveling in the directions whose direction visit evaluation value is equal to or larger than the threshold value in the areas whose area visit evaluation value is equal to or larger than the threshold value. As a result, the information distribution device further can reduce the number of distributions of the notification information unnecessary to the users of the mobile terminals as compared with the configuration where the notification information is distributed uniformly to the mobile terminals located within the areas whose area visit evaluation value is equal to or larger than the threshold value. The threshold value of the area visit evaluation value and that of the direction visit evaluation value may be the same or be different from each other.

According to an aspect of the invention, it is preferable that the distribution area updating part updates the distribution area information recorded in the distribution area recording part such that the distribution area also includes, of areas that are in the vicinity of the areas whose area visit evaluation value is equal to or larger than the threshold value and are in directions opposite to the directions whose visit direction probability is equal to or larger than the threshold value in the areas whose area visit evaluation value is equal to or larger than the threshold value, those whose area visit evaluation value is not calculated by the distribution area evaluation part.

Here, areas that are in the vicinity of the areas whose area visit evaluation value is equal to or larger than the threshold value and are in the directions opposite to the directions whose direction evaluation value is equal to or larger than the threshold value in the areas whose area visit probability is equal to or larger than the threshold value are also likely to have an area visit evaluation value equal to or larger than the threshold value. Thus, according to this configuration, the distribution area updating part updates the distribution area information such that the distribution area also includes, of areas that are in the vicinity of the areas whose area visit evaluation value is equal to or larger than the threshold value and are in the directions opposite to the directions whose visit direction probability is equal to or larger than the threshold value in the areas whose area visit evaluation value is equal to or larger than the threshold value, those whose area visit evaluation value is not calculated by the distribution area evaluation part. Consequently, the information distribution part can distribute the notification information also to the mobile terminals located within the areas that are in the vicinity of the areas whose area visit evaluation value is equal to or larger than the threshold value and are in the directions opposite to the directions whose visit direction probability is equal to or larger than the threshold value in the areas whose area visit evaluation value is equal to or larger than the threshold value.

Hereinafter, more specific embodiments of the present invention will be described in detail with reference to the drawings.

[Embodiment 1]

Figure 1:
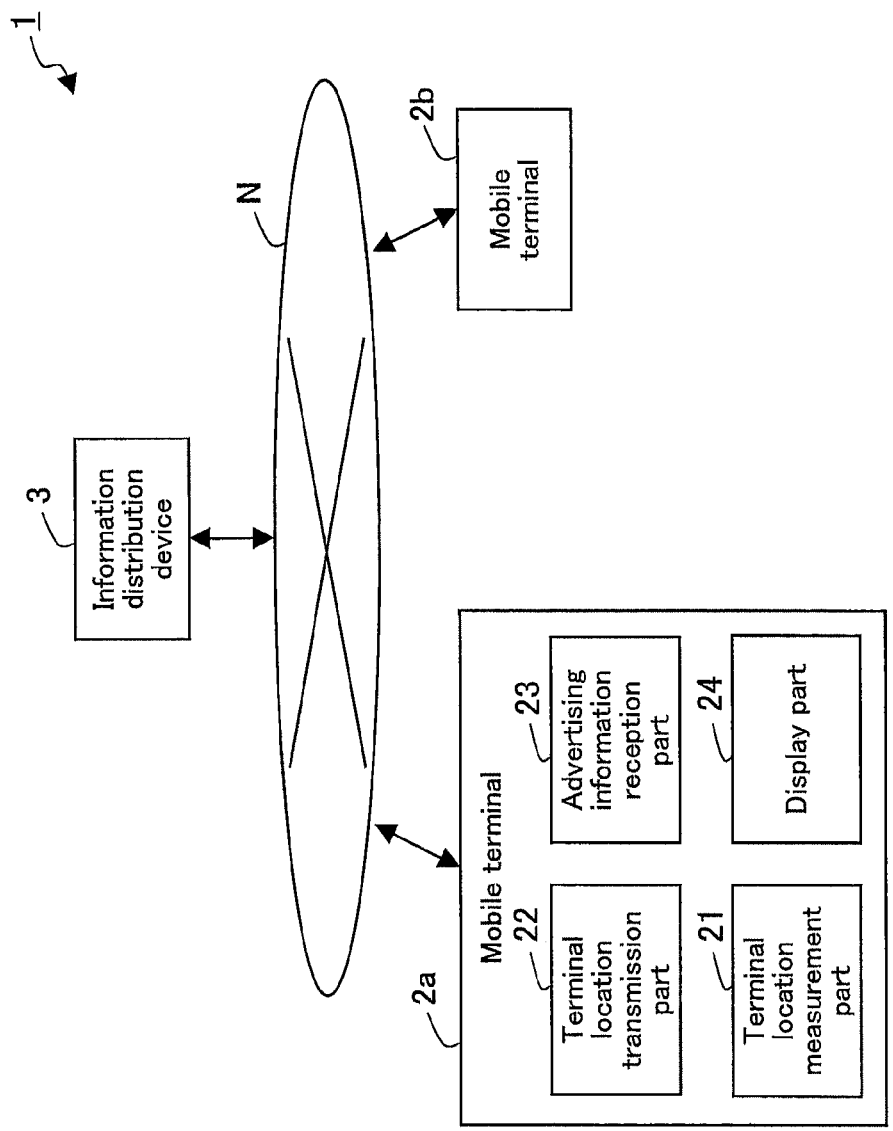
FIG. 1 is a block diagram illustrating a schematic configuration of a distribution system according to Embodiment 1 of the present invention.

FIG. 1 is a block diagram illustrating a schematic configuration of a distribution system 1 according to the present embodiment. More specifically, the distribution system 1 according to the present embodiment includes mobile terminals 2a and 2b and an information distribution device 3. The mobile terminals 2a and 2b and the information distribution device 3 are connected to each other via a network N. Although the mobile terminals 2a and 2b may be, for example, mobile phones, PDAs (Personal Digital Assistants), PHS (Personal Handy-phone System) terminals, HHTs (Hand Held Terminals) or car navigation systems, it is assumed that they are mobile phones in the present embodiment. The information distribution device 3 is a device for distributing, to mobile terminals located within the distribution area, advertising information (notification information) indicating an advertisement for products in which an establishment deals. Here, the establishment may be any of variety establishments, such as a shop, a parking lot, a gas station, a tourist facility, a hospital, a movie theater, a library, a hostel, a golf course, a skiing ground, an amusement park, an art gallery and a museum. The network N may be the Internet, an Ethernet®, a wireless LAN, a mobile phone data communications network or any computer network.

For simplifying the explanation, two mobile terminals, the mobile terminals 2a and 2b, and one information distribution device, the information distribution device 3, are illustrated in FIG. 1. However, the number of the mobile terminals and the information distribution device forming the distribution system 1 can be determined freely. Further, other terminal device, a Web server, a proxy server, a DNS (Domain Name System) server, a DHCP (Dynamic Host Configuration Protocol) server, a radio base station device (Node-B), and a radio network controller (RNC) may be present in the distribution system 1.

In the following description, lowercase English letters have been added to members that have the same functions only when there is a particular need to distinguish one from the other, such as mobile terminal 2a, and when there is no particular need for distinguishing one from the other, or when they are referred to collectively, lowercase English letters are not used in the description, such as "mobile terminal 2".

(Configuration of Mobile Terminals)

The mobile terminal 2a includes a terminal location measurement part 21, a terminal location transmission part 22, an advertising information reception part 23 and a display part 24. Note that the mobile terminal 2b has the same configuration as that of the mobile terminal 2a.

Here, the functions of the terminal location measurement part 21, the terminal location transmission part 22, the advertising information reception part 23 and the display part 24 each are attained by the execution of a predetermined program by an arithmetical unit, such as a CPU of a computer. Therefore, the program for attaining each of the functions on the computer or a recording medium storing the program is also one form of the present invention.

The terminal location measurement part 21 measures the current location of the mobile terminal 2a. Specifically, the terminal location measurement part 21 has a GPS (Global Positioning System) function, so that it receives radio waves transmitted from a plurality of geodetic satellites (GPS satellites) and measures the current location of the mobile terminal 2a on the basis of a relative difference in time between the received radio waves. On the basis of the measurement result, the terminal location measurement part 21 generates terminal location information indicating the current location of the mobile terminal 2a. The terminal location measurement part 21 outputs the generated terminal location information to the terminal location transmission part 22. The terminal location information includes latitude information and longitude information indicating the current latitude and longitude of the mobile terminal 2a, respectively.

Although a description has been given in the above of an example where the terminal location measurement part 21 has a GPS function, the present invention is not limited to this example. That is, the terminal location measurement part 21 may retrieve the terminal location information from nearby radio base station devices or wireless LAN access points with which the mobile terminal 2a can communicate. The terminal location measurement part 21 may also retrieve the terminal location information from road signs or address signs. In other words, as long as the terminal location measurement part 21 can measure the current location of the mobile terminal 2a, the way to measure the current location of the mobile terminal 2a can be adopted freely from a variety of ways.

The terminal location transmission part 22 transmits, via the network N, the terminal location information outputted from the terminal location measurement part 21 to the information distribution device 3. In the present embodiment, every time the terminal location information is outputted from the terminal location measurement part 21, the terminal location transmission part 22 transmits, via the network N, the terminal location information outputted from the terminal location measurement part 21 to the information distribution device 3 in real time. The terminal location transmission part 22 may also transmit the terminal location information to the information distribution device 3 every time the mobile terminal 2a travels a certain distance or at certain time intervals.

The advertising information reception part 23 receives, via the network N, advertising information distributed from the information distribution device 3. That is, the information distribution device 3 distributes the advertising information to the mobile terminal 2a when the mobile terminal 2a is located within the distribution area, and the advertising information reception part 23 receives the distributed advertising information. The process of distributing the advertising information performed by the information distribution device 3 will be described later. The advertising information reception part 23 outputs the received advertising information to the display part 24.

The display part 24 may be, for example, a liquid crystal display, an EL display, a plasma display or a CRT display. The display part 24 displays the advertising information outputted from the advertising information reception part 23. One example of the advertising information displayed on the display part 24 will be described later.

(Configuration of Information Distribution Device for Distributing Advertising Information to Mobile Terminals)

Figure 2:
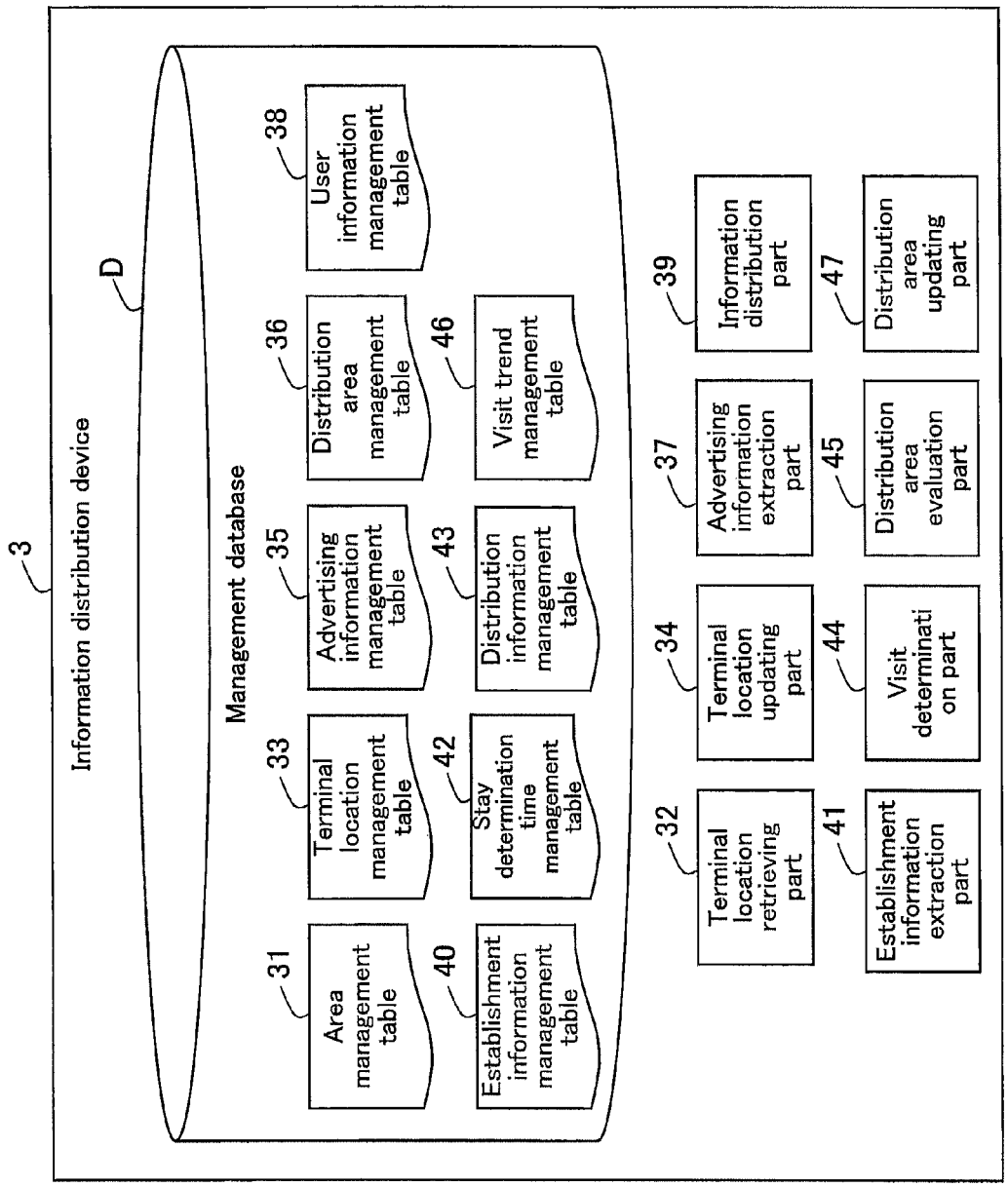
FIG. 2 is a block diagram illustrating a schematic configuration of an information distribution device of the distribution system.

FIG. 2 is a block diagram illustrating a schematic configuration of the information distribution device 3 according to the present embodiment. The information distribution device 3 has the function of distributing the advertising information indicating advertisements for products in which establishments deal. Thus, the information distribution device 3 includes an area management table 31, a terminal location retrieving part 32, a terminal location management table 33, a terminal location updating part 34, an advertising information management table 35, a distribution area management table 36, an advertising information extraction part 37, a user information management table 38 and an information distribution part 39. The tables 31, 33, 35, 36 and 38 each are stored in a management database D of the information distribution device 3.

The functions of the terminal location retrieving part 32, the terminal location updating part 34, the advertising information extraction part 37 and the information distribution part 39 each are attained by the execution of a predetermined program by an arithmetical unit, such as a CPU of a computer. Therefore, the program for attaining each of the functions on the computer or a recording medium storing the program is also one form of the present invention. Further, the area management table 31, the terminal location management table 33, the advertising information management table 35, the distribution area management table 36 and the user information management table 38 are embodied by an internal memory of the computer or a memory to which the computer is accessible.

Figure 3:
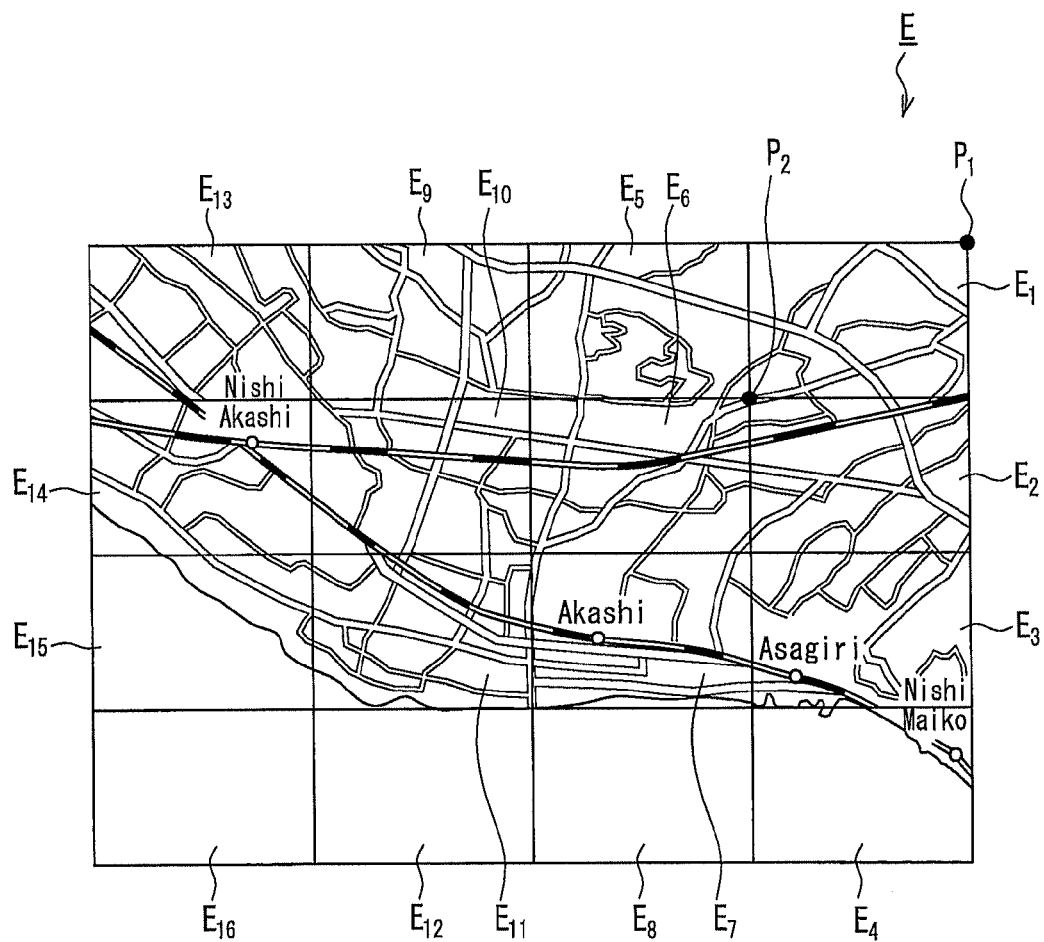
FIG. 3 is a schematic diagram for explaining a case where an area on a map is divided into 16 areas.

In the present embodiment, as illustrated in FIG. 3, a description will be given of a case where an area E on a map is divided into 4×4 to form 16 areas (blocks), areas $E_1$ to $E_{16}$, as an example. As will be described later, to the areas, area ID for uniquely identifying them are assigned. In the present embodiment, the area IDs "M0001" to "M0016" are assigned to the areas $E_1$ to $E_{16}$, respectively.

In the area management table 31, range information indicating the range of each of the areas is pre-recorded. FIG. 4 is a diagram illustrating one example of data recorded in the area management table 31. As illustrated in FIG. 4, in the area management table 31, area IDs and area ranges are recorded. Here, the area IDs are identification codes for uniquely identifying the areas. In the present embodiment, the area IDs "M0001" to "M0016" are recorded. The area ranges represent the ranges for identifying the areas. For example, the area $E_1$ illustrated in FIG. 3 can be identified by a point $P_1$ at the upper right-hand of the area $E_1$ and a point $P_2$ at the lower left-hand of the area $E_1$. In other words, in the column "area range", latitude and longitude information respectively indicating the latitude and longitude of the point $P_1$ and latitude and longitude information respectively indicating the latitude and longitude of the point $P_2$ are recorded.

The terminal location retrieving part 32 retrieves, via the network N, the terminal location information transmitted from the mobile terminals 2. The terminal location retrieving part 32 outputs the retrieved terminal location information to the terminal location updating part 34.

In the terminal location management table 33, the terminal location information indicating the current locations of the mobile terminals 2 is recorded. FIG. 5 is a diagram illustrating one example of data recorded in the terminal location management table 33. As illustrated in FIG. 5, in the terminal location management table 33, mobile terminal IDs, latitude information, longitude information, area IDs and the last update time are recorded. Here, the mobile terminal IDs are identification codes for uniquely identifying the mobile terminals 2. For example, when the mobile terminals 2 are IP phones, the mobile terminal IDs are IP (Internet Protocol) addresses or MAC (Media Access Control) addresses. The latitude information indicates the latitude of the current locations of the mobile terminals 2. The longitude information indicates the longitude of the current locations of the mobile terminals 2. The area IDs are identification codes for uniquely identifying the areas, and here, they are identification codes indicating the areas in which the mobile terminals 2 are located. The last update time is the time at which the latitude information, the longitude information and the area IDs are last updated by the terminal location updating part 34.

The terminal location updating part 34 updates the terminal location information recorded in the terminal location management table 33 to the terminal location information outputted from the terminal location retrieving part 32. The terminal location updating part 34 also detects, with reference to the area management table 31, the areas in which the mobile terminals 2 are currently located on the basis of the terminal location information outputted from the terminal location retrieving part 32. The terminal location updating part 34 updates the area IDs recorded in the terminal location management table 33 to the area IDs indicating the detected areas. Further, the terminal location updating part 34 writes the time at which the terminal location information and the area IDs are updated in the column "last update time" of the terminal location management table 33.

In the advertising information management table (notification information recording part) 35, the advertising information indicating advertisements for products in which establishments deal is pre-recorded. FIG. 6 is a diagram illustrating one example of data recorded in the advertising information management table 35. As illustrated in FIG. 6, in the advertising information management table 35, advertisement IDs, establishment IDs and advertisement texts are recorded. Here, the advertisement IDs are identification codes for uniquely identifying pieces of the advertising information. The establishment IDs are identification codes for uniquely identifying establishments. The advertisement texts represent details of advertisements. The advertising information includes the advertisement IDs, the establishment IDs and the advertisement texts.

In the distribution area management table (distribution area recording part) 36, distribution area information indicating distribution areas to which the advertising information is distributed is recorded. FIG. 7 is a diagram illustrating one example of data recorded in the distribution area management table 36. As illustrated in FIG. 7, in the distribution area management table 36, advertisement IDs and distribution areas are recorded. Here, each of the distribution areas is formed of a plurality of areas. Thus, area IDs assigned to areas where the advertising information is to be distributed are recorded in the column "distribution area". The distribution area information includes the advertisement ID and the distribution areas.

Here, in the distribution area management table 36, distribution area information indicating initially-set distribution areas is recorded prior to the distribution area information being updated by the distribution area updating part 47 (describe later). For example, an initially-set distribution area is formed of an area in which an establishment dealing in products to be advertised is located and eight areas surrounding the establishment-located area.

When any of the mobile terminals 2 is located within the distribution area, the advertising information extraction part 37 extracts the advertising information from the advertising information management table 35. Specifically, first, the advertising information extraction part 37 extracts the distribution area information recorded in the distribution area management table 36. The advertising information extraction part 37 also extracts the area ID recorded in the terminal location management table 33. The advertising information extraction part 37 determines whether or not the area indicated by the extracted area ID is included in the distribution area indicated by the distribution area information. When it is found that the area indicated by the extracted area ID is included in the distribution area indicated by the distribution area information, the advertising information extraction part 37 extracts the advertising information from the advertising information management table 35 on the basis of the advertisement ID indicated by the distribution area information. The advertising information extraction part 37 outputs the extracted advertising information to the information distribution part 39.

In the user information management table 38, information on the users of the mobile terminals 2 is recorded. FIG. 8 is a diagram illustrating one example of data recorded in the user information management table 38. As illustrated in FIG. 8, in the user information management table 38, mobile terminal IDs, user names and e-mail addresses are recorded. Here, the user names are the names of the users. The e-mail addresses are e-mail addresses of the mobile terminals 2. The mobile terminal IDs, the user names and the e-mail addresses recorded in the user information management table 38 are preset by the administrator of the information distribution device 3.

The information distribution part 39 distributes the advertising information outputted from the advertising information extraction part 37 to the mobile terminals located within the distribution area.

Specifically, first, the information distribution part 39 determines whether or not the advertisement ID indicated by the advertising information outputted from the advertising information extraction part 37 and the mobile terminal ID assigned to the mobile terminal 2 to which the advertising information is to be distributed are recorded in the same record of the distribution information management table 43 (described later) (see FIG. 13). When it is found that the advertisement ID and the mobile terminal ID are recorded in the same record of the distribution information management table 43, the information distribution part 39 determines that the advertising information has already been distributed to the mobile terminal 2. In this case, the information distribution part 39 does not distribute the advertising information to the mobile terminal 2.

On the other hand, when it is found that the advertisement ID and the mobile terminal ID are not recorded in the same record of the distribution information management table 43, the information distribution part 39 determines that the advertising information is yet to be distributed to the mobile terminal 2. In this case, the information distribution part 39 extracts the e-mail address recorded in the user information management table 38 on the basis of the mobile terminal ID. The information distribution part 39 distributes the advertising information to the mobile terminal 2 on the basis of the extracted e-mail address. Then, the information distribution part 39 writes the advertisement ID and the mobile terminal ID in the distribution information management table 43. The information distribution part 39 also writes, in the distribution information management table 43, the terminal location information indicating the location of the mobile terminal 2 when the advertising information is distributed to the mobile terminal 2 as terminal location information at the time of distribution. Further, the information distribution part 39 writes, in the distribution information management table 43, the area ID indicating the area in which the mobile terminal 2 is located when the advertising information is distributed to the mobile terminal as the area ID at the time of distribution. Further, the information distribution part 39 writes the time at which the advertising information is distributed to the mobile terminal 2 in the distribution information management table 43.

As an example, it is assumed that the information distribution part 39 distributes the advertising information regarding a convenience store with the establishment name "AAA" (establishment ID "C0001") to the mobile terminal 2a. FIG. 9 is a conceptual diagram illustrating one example of the advertising information to be displayed on the display part 24 of the mobile terminal 2a. As illustrated in FIG. 9, From "info@example.co.jp", To "a001@example.ne.jp" and Subject "From convenience store 'AAA'" are displayed on the display part 24. The e-mail address listed on the From section is the e-mail address of the information distribution device 3 as a sender. The e-mail address listed on the To section is the e-mail address of the mobile terminal 2a as a receiver. The advertising information "Please stop by at convenience store 'AAA.' Sandwiches are now on sale 10% off." is also displayed on the display part 24.

As another example, it is assumed that the information distribution part 39 distributes the advertising information regarding a gas station with the establishment name "CCC" (establishment ID "G0001") to the mobile terminal 2a. FIG. 10 is a conceptual diagram illustrating one example of the advertising information to be displayed on the display part 24 of the mobile terminal 2a. As illustrated in FIG. 10, From "info@example.co.jp", To "a001@example.ne.jp" and Subject "From gas station 'CCC'" are displayed on the display part 24. The advertising information "Please stop by at gas station 'CCC' and save ¥2 on regular gasoline today" is also displayed on the display part 24.

(Configuration of Information Distribution Device for Updating Distribution Area Information)

The information distribution device 3 further has the function of calculating an area visit probability for each of a plurality of areas forming a distribution area and updating the distribution area information on the basis of the calculated area visit probabilities. Thus, the information distribution device 3 further includes an establishment information management table 40, an establishment information extraction part 41, a stay determination time management table 42, a distribution information management table 43, a visit determination part 44, a distribution area evaluation part 45, a visit trend management table 46 and a distribution area updating part 47. The tables 40, 42, 43 and 46 each are stored in the management database D of the information distribution device 3.

The functions of the establishment information extraction part 41, the visit determination part 44, the distribution area evaluation part 45 and the distribution area updating part 47 each are attained by the execution of a predetermined program by an arithmetical unit, such as a CPU of a computer. Therefore, the program for attaining each of the functions on the computer or a recording medium storing the program is also one form of the present invention. Further, the establishment information management table 40, the stay determination time management table 42, the distribution information management table 43 and the visit trend management table 46 are embodied by an internal memory of the computer or a memory to which the computer is accessible.

In the establishment information management table 40, establishment information for identifying establishments, and establishment location information indicating the location ranges of establishments are recorded. FIG. 11 is a diagram illustrating one example of data recorded in the establishment information management table 40. As illustrated in FIG. 11, in the establishment information management table 40, establishment IDs, establishment type IDs, establishment names, latitude information, longitude information, location ranges of establishments and establishment addresses are recorded. Here, the establishment IDs are identification codes for uniquely identifying establishments. The establishment type IDs are identification codes for uniquely identifying the types of establishments. The establishment names are the names of establishments. The latitude information indicates the latitude of the locations of establishments. The longitude information indicates the longitude of the locations of establishments. The location ranges of establishments each indicate the radius of an establishment about the center of the establishment represented by the latitude information and the longitude information. In the present embodiment, each location range of an establishment is expressed in meters (m). Here, as the location range of an establishment, the radius including the entire building of the establishment is set, for example. The establishment addresses indicate the addresses of establishments. The establishment information includes the establishment IDs, the establishment type IDs and the establishment names. Further, the establishment location information includes the latitude information, the longitude information and the location ranges of establishments.

When the current location of any of the mobile terminals 2 indicates that it is within the location range of an establishment, the establishment information extraction part 41 extracts the establishment information indicating the establishment from the establishment information management table 40. Specifically, first, the establishment information extraction part 41 extracts the terminal location information recorded in the terminal location management table 33. Then, the establishment information extraction part 41 determines whether or not the current location of the mobile terminal 2 indicated by the extracted terminal location information indicates that it is within the location range of the establishment indicated by the establishment location information. When it is found that the current location of the mobile terminal 2 indicates that it is within the location range of the establishment, the establishment information extraction part 41 extracts the establishment information indicating the establishment from the establishment information management table 40. The establishment information extraction part 41 outputs the extracted establishment information, together with the terminal location information, to the visit determination part 44.

Recorded in the stay determination time management table 42 is stay determination time, which is a basis for determining whether or not any of the users of the mobile terminals 2 stays at the establishment indicated by the establishment information extracted by the establishment information extraction part 41. FIG. 12 is a diagram illustrating one example of data recorded in the stay determination time management table 42. As illustrated in FIG. 12, in the stay determination time management table 42, establishment type IDs, establishment type names and stay determination time are recorded. Here, the establishment type names are the names of establishment types. In the present embodiment, the establishment type names convenience store, gas station and parking lot are recorded. The stay determination time is recorded for each of the establishment types and is a basis for determining whether or not any the users of the mobile terminals 2 stays at the establishment. In the present embodiment, the stay determination time is expressed in seconds.

Although a description has been given in the above of an example where the stay determination time corresponding to each of the establishment types is recorded in the stay determination time management table 42, the present invention is not limited to this example. For example, stay determination time corresponding to each establishment may be recorded in the stay determination time management table 42.

In the distribution information management table (distribution information recording part) 43, the terminal location information at the time of distribution, the area information at the time of distribution and visit information are recorded. The terminal location information at the time of distribution indicates the locations of the mobile terminals 2 when the advertising information is distributed from the information distribution part 39 to the mobile terminals 2. The area information at the time of distribution indicates the areas in which the mobile terminals 2 are located when the advertising information is distributed from the information distribution part 39 to the mobile terminals 2. The visit information indicates whether or not the users of the mobile terminals 2 have visited an establishment. FIG. 13 is a diagram illustrating one example of data recorded in the distribution information management table 43. As illustrated in FIG. 13, in the distribution information management table 43, advertisement IDs, mobile terminal IDs, latitude information at the time of distribution, longitude information at the time of distribution, area IDs at the time of distribution, distribution time and the presence or absence of visits are recorded.

Here, the latitude information at the time of distribution indicates the latitude of the locations of the mobile terminals 2 when the advertising information is distributed to the mobile terminals 2. The longitude information at the time of distribution indicates the longitude of the locations of the mobile terminals 2 when the advertising information is distributed to the mobile terminals 2. The area IDs at the time of distribution are identification codes that indicate the areas in which the mobile terminals 2 are located when the advertising information is distributed to the mobile terminals 2. The distribution time is the time at which the advertising information is distributed to the mobile terminals 2. The presence or absence of visits indicates whether or not the users of the mobile terminals 2 have visited the establishment. In the present embodiment, when the user of the mobile terminal 2 has visited the establishment, "true" is recorded in the column "presence or absence of visits". On the other hand, when the user of the mobile terminal 2 has not visited the establishment, "false" is recorded in the column "presence or absence of visits." The terminal location information at the time of distribution includes the latitude information at the time of distribution and the longitude information at the time of distribution. The area information at the time of distribution includes the area IDs at the time of distribution. Further, the visit information includes the presence or absence of visits.

When the current location of the mobile terminal 2 indicted by the terminal location information indicates that it has been within the location range of the establishment indicated by the establishment location information for a duration equal to or longer than the stay determination time, the visit determination part 44 determines that the user of the mobile terminal 2 has visited the establishment indicated by the establishment information extracted by the establishment information extraction part 41.

Specifically, on the basis of the establishment ID indicated by the establishment information outputted from the establishment information extraction part 41, the visit determination part 44 extracts the establishment location information recorded in the establishment information management table 40. Also, the visit determination part 44 extracts the stay determination time recorded in the stay determination time management table 42 on the basis of the establishment type ID indicated by the establishment information outputted from the establishment information extraction part 41. The visit determination part 44 determines whether or not the current location of the mobile terminal 2 indicates that it has been within the location range of the establishment for a duration equal to or longer than the stay determination time by counting (measuring), with a timer, the duration from the point at which the current location of the mobile terminal 2 indicated by the terminal location information first indicated its presence within the location range of the establishment indicated by the establishment location information. The result of the count by the timer is recorded in a memory (not shown) of the information distribution device 3.

When it is found that the current location of the mobile terminal 2 indicates that it has been within the location range of the establishment for a duration equal to or longer than the stay determination time, the visit determination part 44 determines that the user of the mobile terminal 2 has visited (stayed at) the establishment indicated by the establishment information extracted by the establishment information extraction part 41. In this case, the visit determination part 44 writes in the distribution information management table 43 "true" indicating that the user of the mobile terminal 2 has visited the establishment. In other words, the visit determination part 42 does not write "true" in the distribution information management table 43 when, for example, the user of the mobile terminal 2 does not stay at the establishment but just passes by.

The visit determination part 44 extracts a record in the distribution information management table 43 at predetermined intervals. When the presence or absence of visits of the extracted record is not "true", the visit determination part 44 compares the distribution time of the extracted record and the current time and determines that the user of the mobile terminal 2 has not visited the establishment indicated by the advertising information when their difference is equal to or larger than a set time. That is, when certain time has elapsed since the distribution of the advertising information to the mobile terminal 2, the visit determination part 44 determines that the user of the mobile terminal 2 has not visited the establishment indicated by the advertisement information if the presence or absence of visits of the extracted record is not "true." In this case, the visit determination part 44 writes in the distribution information management table 43 "false" indicating that the user of the mobile terminal 2 has not visited the establishment.

Before the visit determination part 44 writes either "true" or "false" in the column "presence or absence of visits" of the distribution information management table 43, "unknown" is recorded as a default in the column "presence or absence of visits" of the distribution information management table 43.

The distribution area evaluation part 45 calculates, for each of a plurality of areas forming a distribution area, an area visit probability (area visit evaluation value) indicating, of the users of the mobile terminals 2 who have been within any of the plurality of areas forming the distribution area when the advertising information is distributed from the information distribution part 39, a percentage of those who have visited the establishment indicated by the advertising information distributed to the mobile terminals 2. Specifically, first, the distribution area evaluation part 45 extracts, from the distribution information management table 43, the area information at the time of distribution and the visit information both correlated to the same advertisement ID. Subsequently, the distribution area evaluation part 45 calculates, for each of the area IDs indicated by the area information at the time of distribution, a total of distributions of the advertising information (the number of distributions of advertisements) to the mobile terminals 2 located within each of the areas with the area IDs. In other words, regardless of the presence or absence of visits indicated by the visit information, the distribution area evaluation part 45 calculates, for each of the plurality areas forming the distribution area, a total of distributions of the advertising information to the mobile terminals 2 located within each of the areas (the number of distributions of advertisements). Also, on the basis of the presence or absence of visits indicated by the visit information, the distribution area evaluation part 45 calculates, of the calculated number of distributions of advertisements, the number of users of the mobile terminals 2 who have actually visited the establishment indicated by the advertising information (the number of visits). Further, the distribution area evaluation part 45 calculates the area visit probability by dividing the calculated number of distributions of advertisements by the calculated number of visits. The distribution area evaluation part 45 correlates the calculated number of distributions of advertisements, the number of visits and the area visit probability to the advertisement ID and the area ID and writes them in the distribution trend management table 46.

In this way, the distribution area evaluation part 45 extracts the area information at the time of distribution and the visit information on an advertisement ID basis from the distribution information management table 43, and writes, sequentially in the distribution trend management table 46, the number of distributions of advertisements, the number of visits and the area visit probability calculated on the basis of the extracted area information at the time of distribution and visit information. Here, the number of distributions of advertisements, the number of visits and the area visit probabilities form visit trend information.

In the visit trend management table 46, the visit trend information written by the distribution area evaluation part 45 is recorded. FIG. 14 is a diagram illustrating one example of data recorded in the visit trend management table 46. As illustrated in FIG. 14, in the visit trend management table 46, advertisement IDs, area IDs, the number of distributions of advertisements, the number of visits and the area visit probabilities are recorded. For example, the visit trend management table 46 illustrated in FIG. 14 provides that a total of distributions of the advertising information with the advertisement ID "A0001" (the number of distributions of advertisements) to the mobile terminals 2 located within an area with the area ID "M0002" is "120" and of the "120" users of the mobile terminals 2 who have received the advertisement the number of those who have actually visited the establishment indicated by the advertising information with the advertisement ID "A0001" is "30" (the number of visits). That is, as illustrated in FIG. 14, the area visit probability in this case can be expressed as follows; the number of visits "30"/the number of distributions of advertisements "120"=25.0%.

The distribution area updating part 47 updates the distribution area information recorded in the distribution area management table 36 such that the distribution area only includes the areas whose area visit probability is equal to or larger than a threshold value. The threshold value of the area visit probability is pre-recorded in the memory (not illustrated) of the information distribution device 3.

Hereinafter, one example of specific processing performed by the distribution area updating part 47 will be described.

As illustrated in FIG. 7, it is assumed that, as an example, "M0002", "M0003", "M0004", "M0006", "M0007", "M0008", "M0010", "M0011" and "M0012" are recorded in the distribution area management table 36 as the distribution area for the advertisement ID "A0001". In this case, it is assumed that the area visit probabilities of "M0002", "M0003", "M0004", "M0006", "M0007", "M0008", "M0010", "M0011" and "M0012" recorded in the visit trend management table 46 are "25.0%", "40.0%", "50.0%", "10.0%", "65.5%", "0.0%", "35.0%", "60.0%" and "10.0%", respectively. Also, it is assumed that the threshold value is "30.0%."

In such a case, the distribution area updating part 47 updates the distribution area information recorded in the distribution area management table 36 such that the distribution area only includes the areas whose area visit probability is equal to or larger than the threshold value (30.0%). In other words, the distribution area updating part 47 updates the distribution area information recorded in the distribution area management table 36 such that the distribution area only includes the areas whose area visit probability is equal to or larger than the threshold value (30.0%), in short, the areas "M0003", "M0004", "M0007", "M0010", and "M0011". As a result, "M0003", "M0004", "M0007", "M0010", and "M0011" are newly recorded (updated) in the distribution area management table 36 as the distribution area for the advertisement ID "A0001". Thus, the information distribution part 39 can distribute the advertising information only to the mobile terminals 2 located within the areas "M0003", "M0004", "M0007", "M0010", and "M0011."

Although a description has been given in the above of an example where the uniform threshold value is set for each area visit probability, the present invention is not limited to this example. For example, the threshold value of the area visit probability may be set on an advertisement or establishment type basis.

Further, the members 31 to 47 forming the information distribution device 3 may be placed together in a single device or may be dispersed and placed in a plurality of devices. For example, when the mobile terminals 2 are navigation devices mountable on a mobile unit, such as a vehicle, such members as the establishment information management table 40, the establishment information extraction part 41, the stay determination time management table 42 and the visit determination part 44 included in the information distribution device 3 may be included in the mobile terminals 2.

(Exemplary Operations of Distribution System)

Next, the operations of the distribution system 1 according to the configuration described above will be described with reference to FIGS. 15 to 18.

Figure 15:
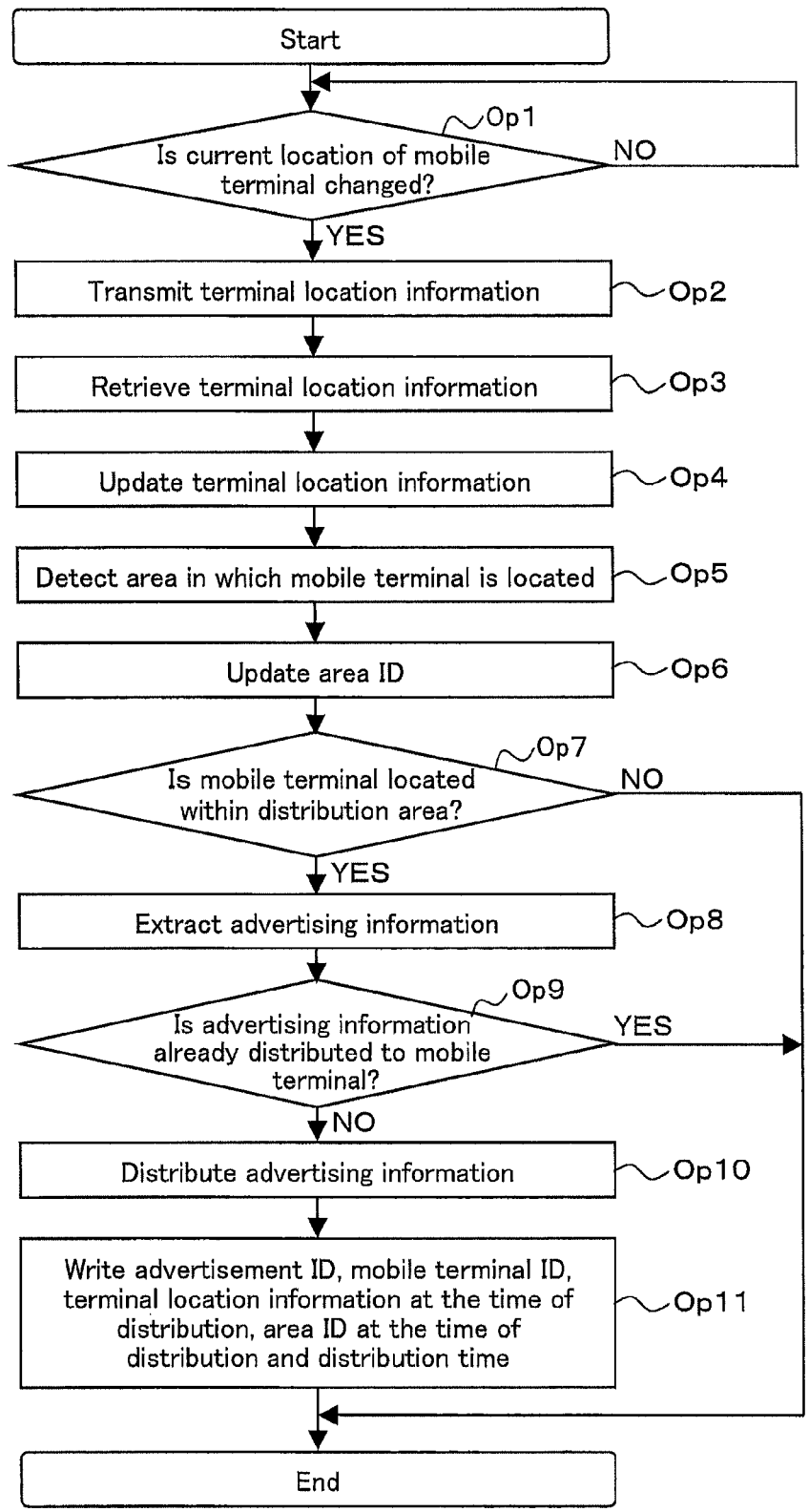
FIG. 15 is a flowchart illustrating an exemplary operation of the distribution system when the information distribution device distributes the advertising information to mobile terminals.

FIG. 15 is a flowchart illustrating an exemplary operation of the distribution system 1 when the information distribution device 3 distributes the advertising information to the mobile terminal 2. As illustrated in FIG. 15, first, when the current location of the mobile terminal 2 changes (YES at Op1), the terminal location measurement part 21 generates terminal location information indicating the current location of the mobile terminal 2, and outputs the generated terminal location information to the terminal location transmission part 22. The terminal location transmission part 22 transmits, via the network N, the terminal location information outputted from the terminal location measurement part 21 to the information distribution device 3 (Op2). On the other hand, when there is no change in the current location of the mobile terminal 2 (No at Op1), the determination process at Op1 is repeated.

Next, the terminal location retrieving part 32 of the information distribution device 3 retrieves, via the network N, the terminal location information transmitted at Op2 (Op3). The terminal location updating part 34 updates the terminal location information recorded in the terminal location management table 33 to the terminal location information retrieved at Op3 (Op4). Then, the terminal location updating part 34 detects, with reference to the area management table 31, the area in which the mobile terminal 2 is located on the basis of the terminal location information retrieved at Op3 (Op5). The terminal location updating part 34 updates the area ID recorded in the terminal location management table 33 to the area ID indicating the area detected at Op5 (Op6).

Subsequently, the advertising information extraction part 37 determines whether or not the mobile terminal 2 is located within the distribution area (Op7). When it is found that the mobile terminal 2 is located within the distribution area (YES at Op7), the advertising information extraction part 37 extracts the advertising information from the advertising information management table 35 on the basis of the advertisement ID indicated by the distribution area information (Op8). On the other hand, when the advertising information extraction part 37 determines that the mobile terminal 2 is not located within the distribution area (No at Op7), the processing of FIG. 15 is ended.

And then, the information distribution part 39 determines whether or not the advertising information extracted at Op8 has already been distributed to the mobile terminal 2 (Op9). When the information distribution part 39 determines that the advertising information extracted at Op8 has already been distributed to the mobile terminal 2 (YES at Op9), the processing of FIG. 15 is ended. On the other hand, when it is found that the advertising information extracted at Op8 is yet to be distributed to the mobile terminal 2 (NO at Op9), the information distribution part 39 distributes the advertising information to the mobile terminal 2 (Op10). As a result, the advertising information distributed at Op10 is displayed on the display part 24 of the mobile terminal 2, for example, as illustrated in FIG. 9 or 10.

Then, the information distribution part 39 writes, in the distribution information management table 43, the advertisement ID, the mobile terminal ID, the terminal location information at the time of distribution, the area ID at the time of distribution and the distribution time (Op11).

Figure 16:
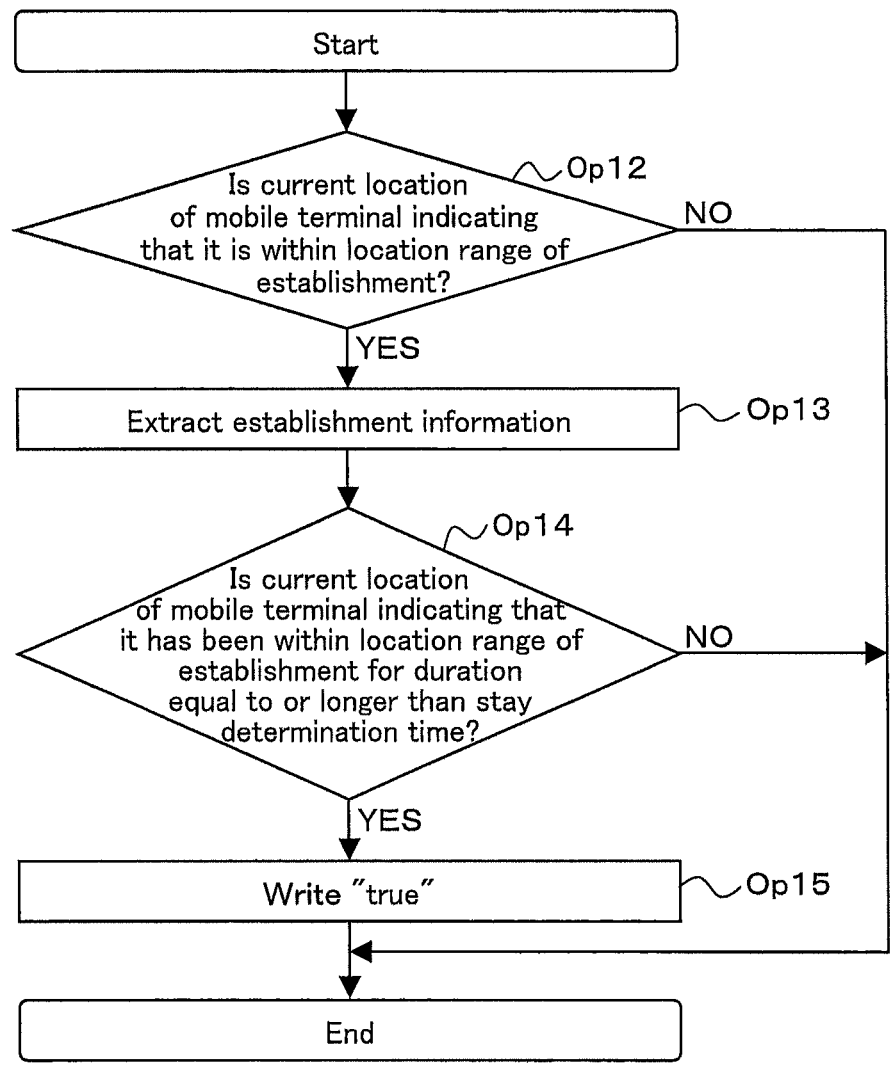
FIG. 16 is a flowchart illustrating an exemplary operation of the information distribution device when determining whether or not the user of the mobile terminal has visited an establishment indicated by the advertising information distributed from the information distribution device.

FIG. 16 is a flowchart illustrating an exemplary operation of the information distribution device 3 when determining whether or not the user of the mobile terminal 2 has visited an establishment indicated by the advertising information distributed by the information distribution device 3. As illustrated in FIG. 16, the establishment information extraction part 41 determines whether or not the current location of the mobile terminal 2 indicated by the terminal location information recorded in the terminal location management table 33 indicates that it is within the location range of an establishment indicated by the establishment location information recorded in the establishment information management table 40 (Op12). When it is found that the current location of the mobile terminal 2 indicates that it is within the location range of the establishment (YES at Op12), the establishment information extraction part 41 extracts, from the establishment information management table 40, the establishment information indicating the establishment (Op13). On the other hand, when the establishment information extraction part 41 determines that the current location of the mobile terminal 2 does not indicate that it is within the location range of the establishment (No at Op12), the processing of FIG. 16 is ended.

And then, the visit determination part 44 determines whether or not the current location of the mobile terminal 2 indicates that it has been within the location range of the establishment for a duration equal to or longer than the stay determination time (Op14). When it is found that the current location of the mobile terminal 2 indicates that it has been within the location range of the establishment for a duration equal to or longer than the stay determination time (YES at Op14), the visit determination part 44 determines that the user of the mobile terminal 2 has visited the establishment indicated by the establishment information extracted at Op13. In this case, the visit determination part 44 writes, in the distribution information management table 43, "true" indicating that the user of the mobile terminal 2 has visited the establishment (Op15). On the other hand, when the visit determination part 44 determines that the current location of the mobile terminal 2 does not indicate that it has been within the location range of the establishment for a duration equal to or longer than the stay determination time (NO at Op14), the processing of FIG. 16 is ended.

Figure 17:
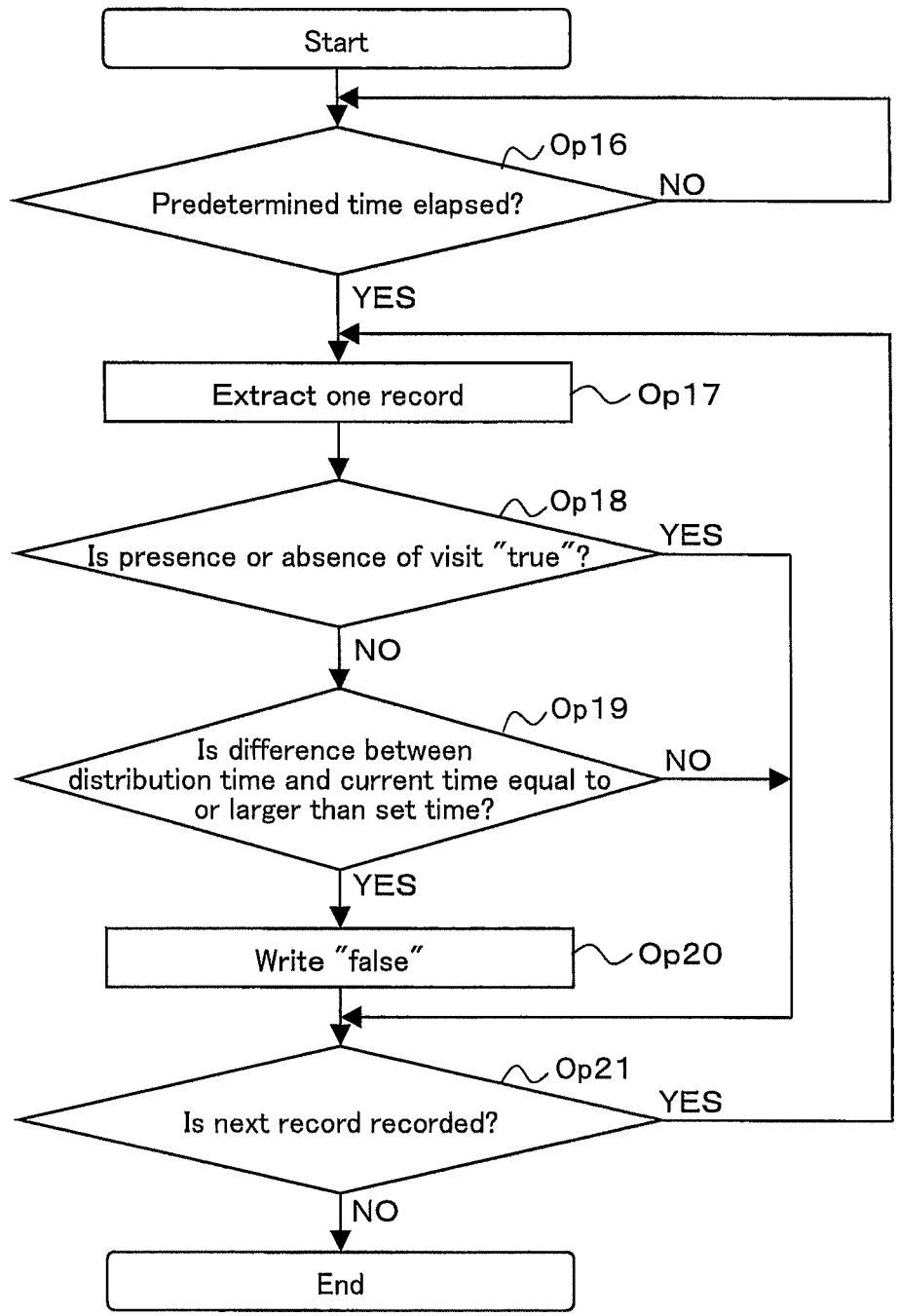
FIG. 17 is a flowchart illustrating an exemplary operation of the information distribution device when it is found that the user of the mobile terminal has not visited the establishment indicated by the advertising information.

FIG. 17 is a flowchart illustrating an exemplary operation of the information distribution device 3 when it is found that the user of the mobile terminal 2 has not visited the establishment indicated by the advertising information. As illustrated in FIG. 17, first, the visit determination part 44 determines whether or not a predetermined time has elapsed (Op16). When it is found that the predetermined time has elapsed (YES at Op16), the visit determination part 44 extracts the top record in the distribution information management table 43 (Op17). On the other hand, when it is found that the predetermined time has not elapsed (NO at Op16), the visit determination part 43 repeats the determination process of Op16. The predetermined time is pre-recorded in the memory (not illustrated) of the information distribution device 3.

Then, the visit determination part 44 determines whether or not the presence or absence of visits of the record extracted at Op17 is "true" (Op18). When it is found that the presence or absence of visits of the extracted record is not "true" (NO at Op18), the visit determination part 44 determines whether or not the difference between the distribution time of the extracted record and the current time is equal to or larger than a set time (Op19). On the other hand, when the visit determination part 44 determines that the presence or absence of visits of the extracted record is "true" (YES at Op18), the processing advances to Op21. The set time is pre-recorded in the memory (not illustrated) of the information distribution device 3.

Subsequently, when it is found that the difference between the distribution time of the extracted record and the current time is equal to or larger than the set time (YES at Op19), the visit determination part 44 determines that the user of the mobile terminal 2 has not visited the establishment indicated by the advertising information and writes, in the distribution information management table 43, "false" indicating that the user of the mobile terminal 2 has not visited the establishment (Op20). On the other hand, when the visit determination part 44 determines that the difference between the distribution time of the extracted record and the current time is less than the set time (NO at Op19), the processing advances to Op21.

And then, the visit determination part 44 determines whether or not the next record is recorded in the distribution information management table 43 (Op21). When it is found that the next record is recorded in the distribution information management table 43 (YES at Op21), the processing returns to Op17 and the visit determination part 44 extracts the next record in the distribution information management table 43. On the other hand, when the visit determination part 44 determines that the next record is not recorded in the distribution information management table 43 (NO at Op21), the processing of FIG. 17 is ended.

Figure 18:
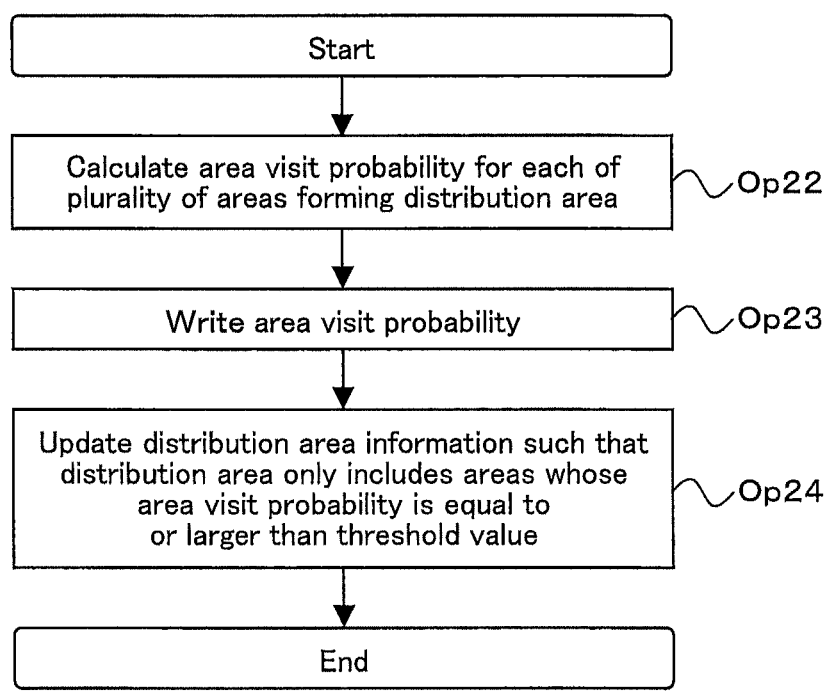
FIG. 18 is a flowchart illustrating an exemplary operation of the information distribution device when updating distribution area information.

FIG. 18 is a flowchart illustrating an exemplary operation of the information distribution device 3 when updating the distribution area information. As illustrated in FIG. 18, the distribution area evaluation part 45 calculates, for each of a plurality of areas forming the distribution area, an area visit probability indicating, of the users of the mobile terminals 2 who have been in any of the plurality of areas forming the distribution area when the advertising information is distributed from the information distribution part 39, a percentage of those have who visited an establishment indicated by the advertising information distributed to the mobile terminals 2 (Op22). The distribution area evaluation part 45 writes the area visit probabilities calculated at Op22 in the visit trend management table 46 (Op23).

Then, the distribution area updating part 47 updates the distribution area information recorded in the distribution area management table 36 such that the distribution area only includes the areas whose area visit probability is equal to or larger than the threshold value (Op24). As a result, the information distribution part 39 can distribute the advertising information to the mobile terminals located within the distribution area indicated by the distribution area information updated at Op24.

As described above, according to the distribution system 1 of the present embodiment, the distribution area evaluation part 45 calculates, for each of a plurality of areas forming the distribution area and based on the area information at the time of distribution, an area visit probability indicating, of the users of the mobile terminals 2 who have been within any of the plurality of areas forming the distribution area when the advertising information is distributed from the information distribution part 39, a percentage of those who have visited a location indicated by the advertising information distributed to the mobile terminals 2. The distribution area updating part 47 updates the distribution area information recorded in the distribution area management table 36 such that the distribution area only includes the areas whose area visit probability is equal to or larger than the threshold value. In other words, the areas whose area visit probability is less than the threshold value are removed from the distribution area. Thus, the information distribution part 39 can distribute the advertising information only to the mobile terminals located within the areas whose area visit probability is equal to or larger than the threshold value. As a result, the information distribution device 3 according to the present embodiment can reduce the number of distributions of the advertisement information unnecessary to the users of the mobile terminals 2. Consequently, the advertising expenses (communications expenses) borne by the proprietors of establishments can be reduced while ensuring the profits of the establishments to be more than a certain amount.

Note that the embodiment described above is one specific example of embodiments of the present invention and a variety of modifications can be made. Hereinafter, a major modified example will be described.

[Modified Example]

In the embodiment described above, a description has been given of an example where the distribution area updating part 47 updates the distribution area information recorded in the distribution area management table 36 such that the distribution area only includes the areas whose area visit probability is equal to or larger than the threshold value. However, it is highly likely that, of areas adjacent to the areas whose area visit probability is equal to or larger than the threshold value, those whose area visit probability is not calculated by the distribution area evaluation part 45 (i.e., unevaluated areas) also have an area visit probability equal to or larger than the threshold value. Thus, in addition to the functions of the distribution area updating part 47 according to the above-described embodiment, the distribution area updating part 47 according to this modified example has the following function. That is, the distribution area updating part 47 according to this modified example updates the distribution area information recorded in the distribution area management table 36 such that the distribution area also includes, of areas adjacent to the areas whose area visit probability is equal to or larger than the threshold value, those whose area visit probability is not calculated by the distribution area evaluation part 45.

Figure 19:
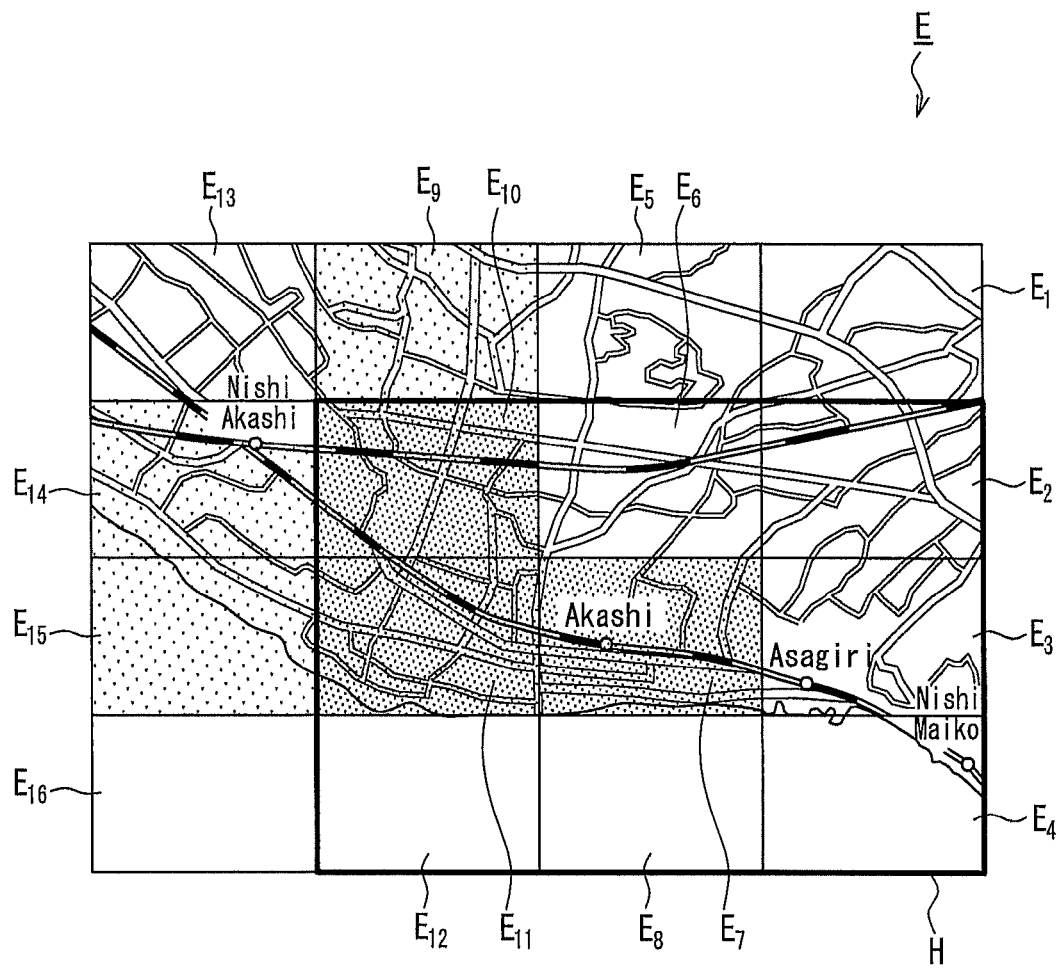
FIG. 19 is a schematic diagram for explaining the relationship between the distribution area and, of areas adjacent to areas whose area visit probability is equal to or larger than a threshold value, those whose area visit probability is not calculated by a distribution area evaluation part.

As illustrated in FIG. 19, it is assumed that, as an example, nine areas, areas $E_2$, $E_3$, $E_4$, $E_6$, $E_7$, $E_8$, $E_{10}$, $E_{11}$ and $E_{12}$, form a distribution area H. In this case, it is assumed that the areas whose area visit probability is equal to or larger than the threshold value are three areas, the areas $E_7$, $E_{10}$ and $E_{11}$. Thus, of areas adjacent to the areas whose area visit probability is equal to or larger than the threshold value, those whose area visit probability is not calculated by the distribution area evaluation part 45 are three areas, the areas $E_9$, $E_{14}$ and $E_{15}$.

In such a case, the distribution area updating part 47 updates the distribution area information recorded in the distribution area management table 36 such that the distribution area only includes six areas, the areas $E_7$, $E_9$, $E_{10}$, $E_{11}$, $E_{14}$ and $E_{15}$. Consequently, the information distribution part 39 can also distribute the advertising information to the mobile terminals 2 located within, of areas adjacent to the areas whose area visit probability is equal to or larger than the threshold value, those whose area visit probability is not calculated by the distribution area evaluation part 45.

In other words, the distribution area in the above-described embodiment is narrowed every time the distribution area information is updated but the distribution area in this modified example can be maintained to cover a constant range even if the distribution area information is updated.

Although a description has been given in the above of an example where the distribution area updating part 47 updates the distribution area information such that the distribution area also includes, of areas adjacent to the areas whose area visit probability is equal to or larger than the threshold value, those whose area visit probability is not calculated by the distribution area evaluation part 45, the present invention is not limited to this example. In other words, areas to be included in the distribution area are not only limited to those adjacent to the areas whose area visit probability is equal to or larger than the threshold value but also those in the vicinity of the areas whose area visit probability is equal to or higher than the threshold value. That is, the distribution area updating part 47 may update the distribution area information such that the distribution area also includes, of areas in the vicinity of the areas whose area visit probability is equal to or larger than the threshold value, those whose area visit probability is not calculated by the distribution area evaluation part 45.

[Embodiment]2

In Embodiment 1, a description has been given of an example where an area visit probability is calculated for each of a plurality of areas forming the distribution area and the advertising information is distributed only to the mobile terminals located within the areas whose calculated area visit probability is equal to or larger than the threshold value. However, even for the area whose area visit probability is equal to or larger than the threshold value, it is conceivable that the visit probability varies depending on whether or not users of mobile terminals are traveling in the direction in which the establishment is located (or driving in the direction of the road heading to the establishment). In other words, when the advertising information is distributed to users of mobile terminals who are within the distribution area and are traveling in the direction in which the establishment is located, they are likely to visit the establishment. On the other hand, when the advertising information is distributed to users of mobile terminals who are within the distribution area but are traveling in the opposite direction to the establishment, they are less likely to visit the establishment. Thus, the advertising information may be beneficial to the users traveling in the direction in which the establishment is located but be useless to those traveling in the opposite direction to the establishment. For this reason, in the present embodiment, a description will be given of an example where whether to distribute the advertising information or not is determined in accordance with the directions in which the mobile terminals are traveling even when they are located within the areas whose area visit probability is equal to or larger than the threshold value.

Figure 20:
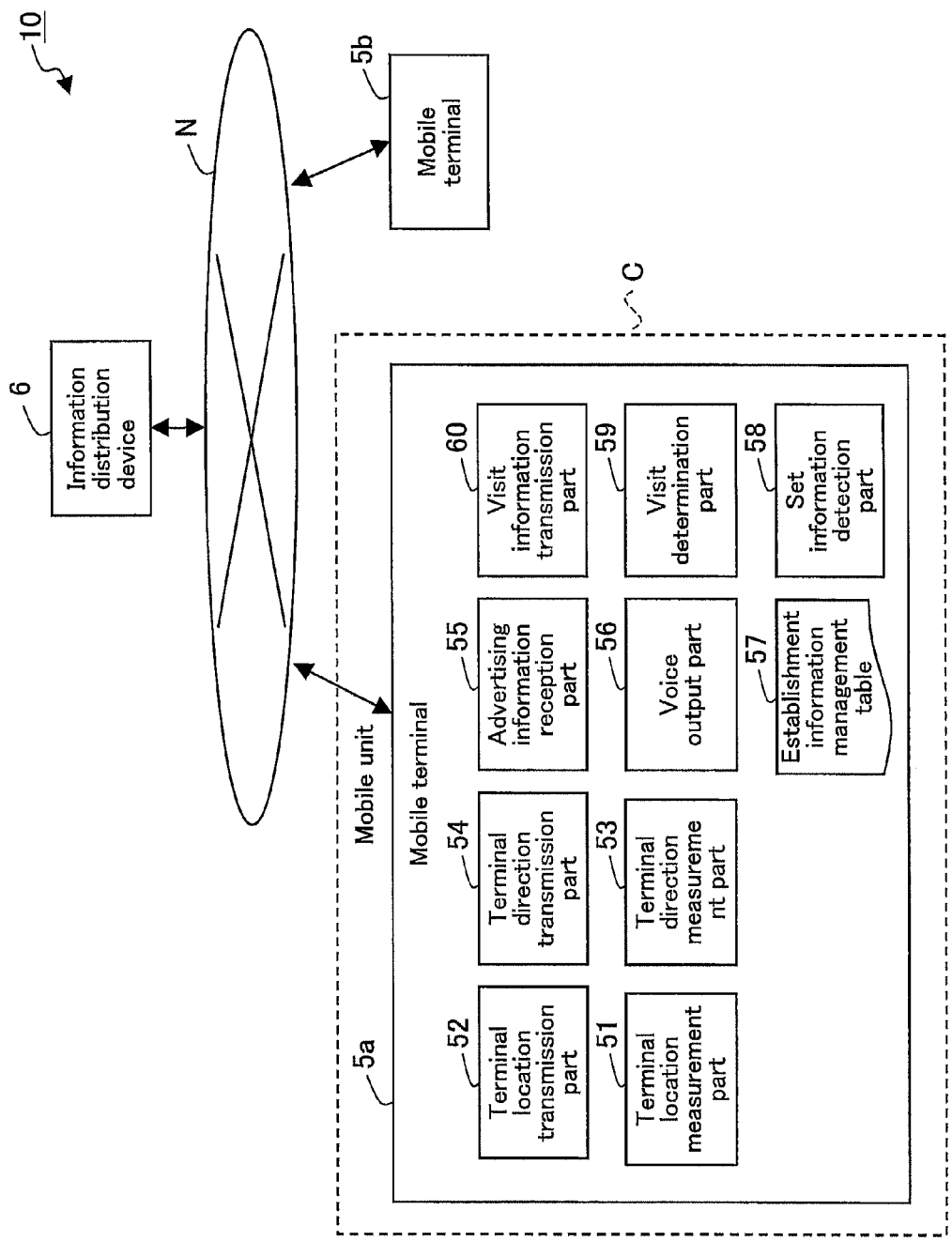
FIG. 20 is a block diagram illustrating a schematic configuration of a distribution system according to Embodiment 2 of the present invention.

FIG. 20 is a block diagram illustrating a schematic configuration of a distribution system 10 according to the present embodiment. More specifically, the distribution system 10 according to the present embodiment includes mobile terminals 5a and 5b and an information distribution device 6. The mobile terminals 5a and 5b and the information distribution device 6 are connected to each other via the network N. Although the mobile terminals 5a and 5b may be, for example, mobile phones, PDAs, PHS terminals, HHTs or car navigation systems, it is assumed that they are car navigation systems in the present embodiment. Thus, the mobile terminals 5 according to the present embodiment each are mounted on a mobile unit C, such as a vehicle. The information distribution device 6 is a device for distributing advertising information (notification information) to the mobile terminals 5 located within the distribution area. The network N may be the Internet, an Ethernet®, a wireless LAN, a mobile phone data communications network or any computer network.

(Configuration of Mobile Terminals)

The mobile terminal 5a includes a terminal location measurement part 51, a terminal location transmission part 52, a terminal direction measurement part 53, a terminal direction transmission part 54, an advertising information reception part 55, a voice output part 56, an establishment information management table 57, a set information detection part 58, a visit determination part 59 and a visit information transmission part 60. Note that the mobile terminal 5b also has the same configuration as that of the mobile terminal 5a.

Here, the functions of the terminal location measurement part 51, the terminal location transmission part 52, the terminal direction measurement part 53, the terminal direction transmission part 54, the advertising information reception part 55, the voice output part 56, the set information detection part 58, the visit determination part 59 and the visit information transmission part 60 each are attained by the execution of a predetermined program by an arithmetical unit, such as a CPU of a computer. Therefore, the program for attaining each of the functions on the computer or a recording medium storing the program is also one form of the present invention. Further, the establishment information management table 57 is embodied by an internal memory of the computer or a memory to which the computer is accessible.

The terminal location measurement part 51 has the same function as that of the terminal location measurement part 21 illustrated in FIG. 1. That is, the terminal location measurement part 51 measures the current location of the mobile terminal 5a.

The terminal location transmission part 52 has the same function as that of the terminal location transmission part 22 illustrated in FIG. 1. That is, the terminal location transmission part 52 transmits, via the network N, terminal location information measured by the terminal location measurement part 51 to the information distribution device 6.

The terminal direction measurement part 53 measures the direction in which the mobile terminal 5a travels on the basis of the terminal location information measured by the terminal location measurement part 51. Although eight directions, north, northeast, east, southeast, south, southwest, west and northwest, are used in the present embodiment, the directions to be used are not limited to these and may be determined freely. That is, the number of the directions may be 16, 24 or even 4. On the basis of the measurement result, the terminal direction measurement part 53 generates terminal direction information indicating the direction in which the mobile terminal 5a travels. The terminal direction measurement part 53 outputs the generated terminal direction information to the terminal direction transmission part 54.

The terminal direction transmission part 54 transmits, via the network N, the terminal direction information outputted from the terminal direction measurement part 53 to the information distribution device 6.

The advertising information reception part 55 has the same function as that of the advertising information reception part 23 illustrated in FIG. 1. That is, the advertising information reception part 55 receives, via the network N, the advertising information distributed from the information distribution device 6. The advertising information reception part 55 outputs the received advertising information to the voice output part 56 and the visit determination part 59.

The voice output part 56 outputs the advertising information outputted from the advertising information reception part 55 in voice. Thus, the voice output part 56 has a voice synthesizing function. Because the advertising information is outputted by the voice output part 56 in voice, the user can check the advertising information in a so-called eyes-free manner (without using eyes) even when the user is in the middle of driving the mobile unit C.

In the establishment information management table 57, establishment information for identifying establishments and establishment location information indicating the location ranges of establishments are recorded. Data recorded in the establishment information management table 57 is the same as the data recorded in the establishment information management table 40 illustrated in FIG. 11.

When the user of the mobile terminal 5a sets a desired establishment as the destination or a stopping point to attain navigation, the set information detection part 58 detects the set establishment as set information. The set information detection part 58 extracts establishment information from the establishment information management table 57 on the basis of the detected set information. The set information detection part 58 outputs the extracted establishment information to the visit determination part 59.

When the user of the mobile terminal 5a who has received the advertising information sets an establishment indicated by the advertising information as the destination or a stopping point, the visit determination part 59 determines that the user of the mobile terminal 5a has visited the establishment.

Specifically, the visit determination part 59 determines whether or not the establishment ID indicated by the advertising information outputted from the advertising information reception part 55 and the establishment ID indicated by the establishment information outputted from the set information detection part 58 coincide with each other. When it is found that the establishment ID indicated by the advertising information outputted from the advertising information reception part 55 and the establishment ID indicated by the establishment information outputted from the set information detection part 58 coincide with each other, the visit determination part 59 determines that the user of the mobile terminal 5a has visited the establishment indicated by the establishment information outputted from the advertising information reception part 55. In this case, the visit determination part 59 outputs, to the visit information transmission part 60, visit information indicating that the user of the mobile terminal 5a has visited the establishment indicated by the advertising information.

The visit information transmission part 60 transmits, via the network N, the visit information outputted from the visit determination part 59 to the information distribution device 6.

(Configuration of Information Distribution Device for Distributing Advertising Information to Mobile Terminals)

Figure 21:
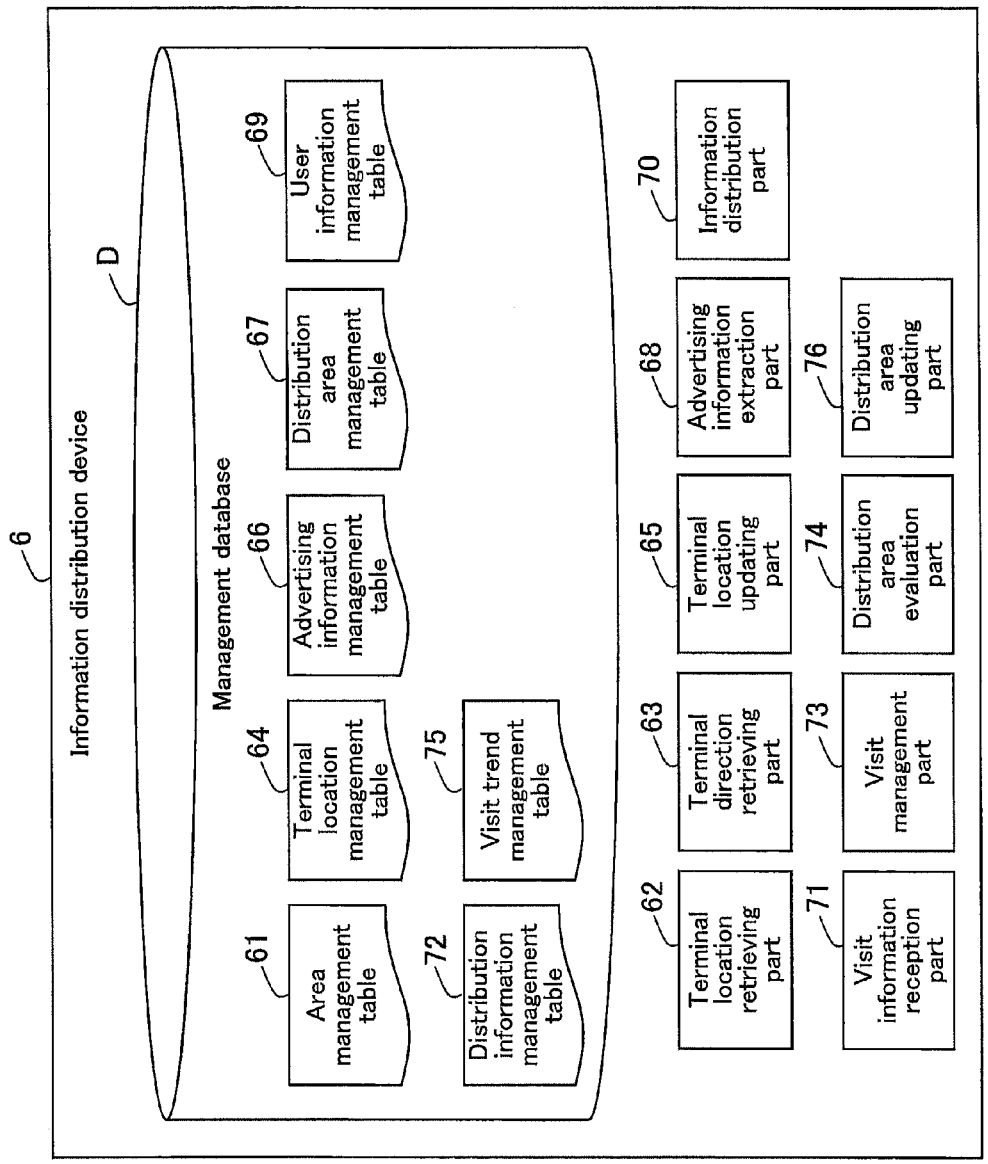
FIG. 21 is a block diagram illustrating a schematic configuration of an information distribution device of the distribution system.

FIG. 21 is a block diagram illustrating a schematic configuration of the information distribution device 6 according to the present embodiment. Here, the information distribution device 6 has the function of distributing the advertising information indicating advertisements for products in which establishments deal to the mobile terminals 5. Thus, the information distribution device 6 includes an area management table 61, a terminal location retrieving part 62, a terminal direction retrieving part 63, a terminal location management table 64, a terminal location updating part 65, an advertising information management table 66, a distribution area management table 67, an advertising information extraction part 68, a user information management table 69 and an information distribution part 70. The tables 61, 64, 66, 67 and 69 each are stored in a management database D of the information distribution device 6.

Here, the functions of the terminal location retrieving part 62, the terminal direction retrieving part 63, the terminal location updating part 65, the advertising information extraction part 68 and the information distribution part 70 each are attained by the execution of a predetermined program by an arithmetical unit, such as a CPU of a computer. Therefore, the program for attaining each of the functions on the computer or a recording medium storing the program is also one form of the present invention. Further, the area management table 61, the terminal location management table 64, the advertising information management table 66, the distribution area management table 67 and the user information management table 69 are embodied by an internal memory of the computer or a memory to which the computer is accessible.

In the area management table 61, range information indicating the range of each of the areas is pre-recorded. Data recorded in the area management table 61 is the same as the data recorded in the area management table 31 illustrated in FIG. 4.

The terminal location retrieving part 62 has the same function as that of the terminal location retrieving part 32 illustrated in FIG. 1. That is, the terminal location retrieving part 62 retrieves, via the network N, the terminal location information transmitted from the mobile terminals 5.

The terminal direction retrieving part 63 retrieves, via the network N, the terminal direction information transmitted from the mobile terminals 5. The terminal direction retrieving part 63 outputs the retrieved terminal direction information to the terminal location updating part 65.

In the terminal location management table 64, the terminal location information indicating the current locations of the mobile terminals 5, and the terminal direction information indicating the directions in which the mobile terminals 5 travel are recorded. FIG. 22 is a diagram illustrating one example of data recorded in the terminal location management table 64. As illustrated in FIG. 22, in the terminal location management table 64, mobile terminal IDs, latitude information, longitude information, traveling directions, area IDs and the last update time are recorded. Here, the traveling directions indicate the directions in which the mobile terminals 5 currently travel. The terminal direction information includes the traveling directions.

The terminal location updating part 65 updates the terminal location information recorded in the terminal location management table 64 to the terminal location information outputted from the terminal location retrieving part 62. Also, the terminal location updating part 65 updates the terminal direction information recorded in the terminal location management table 64 to the terminal direction information outputted from the terminal direction retrieving part 63. Further, the terminal location updating part 65 detects, with reference to the area management table 61, the areas in which the mobile terminals 5 are located on the basis of the terminal location information outputted from the terminal location retrieving part 62. The terminal location updating part 65 updates the area IDs recorded in the terminal location management table 64 to the area IDs indicated by the detected areas. Further, the terminal location updating part 65 writes the time at which the terminal location information, the terminal direction information and the area IDs are updated in the column "last update time" of the terminal location management table 64.

In the advertising information management table (notification information recording part) 66, the advertising information indicating advertisements for products in which establishments deal is pre-recorded. Data recorded in the advertising information management table 66 is the same as the data recorded in the advertising information management table 35 illustrated in FIG. 6.

In the distribution area management table (distribution area recording part) 67, distribution area information indicating distribution areas to which the advertising information is to be distributed and distribution direction information indicating the distribution directions are recorded. FIG. 23 is a diagram illustrating one example of data recorded in the distribution area management table 67. As illustrated in FIG. 23, in the distribution area management table 67, advertisement IDs, distribution areas and distribution directions are recorded. Here the distribution directions are recorded for each of a plurality of areas forming the distribution area. In the distribution area management table 67 illustrated in FIG. 23, eight directions, north, northeast, east, southeast, south, southwest, west and northwest, are recorded for each of a plurality of areas forming the distribution area. The distribution area information includes the advertisement IDs and the distribution areas. The distribution direction information includes the distribution directions.

When any of the mobile terminals 5 is located within any of a plurality of areas forming the distribution area and is traveling in any of the distribution directions indicated by the distribution direction information in any of the areas, the advertising information extraction part 68 extracts the advertising information from the advertising information management table 66. Specifically, first, the advertising information extraction part 68 extracts the distribution area information recorded in the distribution area management table 67. The advertising information extraction part 68 also extracts the area ID recorded in the terminal location management table 64. Then, the advertising information extraction part 68 determines whether or not the area indicated by the extracted area ID is included in the distribution area indicated by the distribution area information. When it is found that the area indicated by the extracted area ID is included in the distribution area indicated by the distribution area information, the advertising information extraction part 68 further carries out the next process.

That is, the advertising information extraction part 68 extracts the distribution direction information recorded in the distribution area management table 67. The advertising information extraction part 68 also extracts the terminal direction information recorded in the terminal direction management table 64. Then, the advertising information extraction part 68 determines whether or not the traveling direction of the mobile terminal 5 indicated by the extracted terminal direction information coincide with any of the distribution directions indicated by the distribution direction information. When it is found that the traveling direction of the mobile terminal 5 indicated by the extracted terminal direction information coincide with any of the distribution directions indicated by the distribution direction information, the advertising information extraction part 68 extracts the advertising information from the advertising information management table 66 on the basis of the advertisement ID indicted by the distribution area information. The advertising information extraction part 68 outputs the extracted advertising information to the information distribution part 70.

In the user information management table 69, information on the users of the mobile terminals 5 is recorded. Data recorded in the user information management table 69 is the same as the data recorded in the user information management table 38 illustrated in FIG. 8.

To the mobile terminals 5 located within any of the plurality of areas forming the distribution area and traveling in the distribution directions indicated by the distribution direction information in any of the areas, the information distribution part 70 distributes the advertising information outputted from the advertising information extraction part 68.

As an example, it is assumed that the information distribution part 70 distributes the advertising information regarding a convenience store with the establishment name "AAA" (establishment ID "C0001") to the mobile terminal 5a. In this case, the voice output part 56 of the mobile terminal 5a outputs "please stop by at convenience store 'AAA.' Sandwiches are now on sale 10% off" to the user of the mobile terminal 5a in voice. As another example, it is assumed that the information distribution part 70 distributes the advertising information regarding a gas station with the establishment name "CCC" (establishment ID "G0001") to the mobile terminal 5a. In this case, the voice output part 56 of the mobile terminal 5a outputs "please stop by at gas station 'CCC' and save ¥2 on regular gasoline today" to the user of the mobile terminal 5a in voice. Note that these advertising information contents are merely examples.

(Configuration of Information Distribution Device for Updating Distribution Direction Information)

The information distribution device 6 further has the function of calculating, for each of a plurality of predetermined directions in each of a plurality of areas forming the distribution area, a direction visit probability and updating the distribution direction information on the basis of the calculated direction visit probabilities. Thus, the information distribution device 6 further includes a visit information reception part 71, a distribution information management table 72, a visit management part 73, a distribution area evaluation part 74, a visit trend management table 75 and a distribution area updating part 76. The tables 72 and 75 each are stored in the management database D of the information distribution device 6.

Here, the functions of the visit information reception part 71, the visit management part 73, the distribution area evaluation part 74 and the distribution area updating part 76 each are attained by the execution of a predetermined program by an arithmetical unit, such as a CPU of a computer. Therefore, the program for attaining each of the functions on the computer or a recording medium storing the program is also one form of the present invention. Further, the distribution information management table 72 and the visit trend management table 75 are embodied by an internal memory of the computer or a memory to which the computer is accessible.

The visit information reception part 71 receives, via the network N, the visit information transmitted from the mobile terminals 5. The visit information reception part 71 outputs the received visit information to the visit management part 73.

In the distribution information management table (distribution information recording part) 72, terminal location information at the time of distribution, terminal direction information at the time of distribution, area information at the time of distribution and visit information are recorded. The terminal direction information at the time of distribution indicates the directions in which the mobile terminals 5 travel when the advertising information is distributed from the information distribution part 70 to the mobile terminals 5, which is obtained from the terminal direction information. FIG. 24 is a diagram illustrating one example of data recorded in the distribution information management table 72. As illustrated in FIG. 24, in the distribution information management table 72, advertisement IDs, mobile terminal IDs, latitude information at the time of distribution, longitude information at the time of distribution, the terminal direction information at the time of distribution, area IDs at the time of distribution, distribution time and the presence or absence of visits are recorded.

On the basis of the visit information outputted from the visit information reception part 71, the visit management part 73 writes "true" in the column "presence or absence of visits" of the distribution information management table 72. Also, the visit management part 73 extracts a record of the distribution information management table 72 at predetermined intervals. When the presence or absence of visits of the extracted record is not "true", the visit management part 73 compares the distribution time of the extracted record and the current time, and determines that the user of the mobile terminal 5 has not visited the establishment indicated by the advertising information when the difference is equal to or larger than a set time. In this case, the visit management part 73 writes in the distribution information management table 72 "false" indicating that the user of the mobile terminal 5 has not visited the establishment.

In addition to the functions of the distribution area evaluation part 45 illustrated in FIG. 2, the distribution area evaluation part 74 has the following function. That is, the distribution area evaluation part 74 calculates, for each of a plurality of predetermined directions in each of a plurality of areas forming the distribution area, a direction visit probability (direction visit evaluation value) indicating, of the users of the mobile terminals 5 who have been traveling in any one of the plurality of directions in any one of the plurality of areas forming the distribution area when the advertising information is distributed from the information distribution part 70, a percentage of those who have visited the establishment indicated by the advertising information distributed to the mobile terminals 5.

Specifically, first, the distribution area evaluation part 74 extracts, from the distribution information management table 72, the terminal location information at the time of distribution and the visit information both correlated to the same advertisement ID and area ID at the time of distribution. Then, for each of the directions in each of the plurality of areas forming the distribution area, the distribution area evaluation part 74 calculates a total of distributions of the advertising information to the mobile terminals 5 traveling in each of the directions (the number of distributions of advertisements). On the basis of the presence or absence of visits indicated by the visit information, the distribution area evaluation part 74 also calculates, of the calculated number of distributions of advertisements, the number of users of the mobile terminals 5 who have actually visited the establishment indicated by the advertising information (the number of visits). Further, the distribution area evaluation part 74 calculates each direction visit probability by dividing the calculated number of visits by the calculated number of distributions of advertisements. The distribution area evaluation part 74 writes, in the distribution trend management table 75, the calculated number of distributions of advertisements, the calculated number of visits and the calculated direction visit probabilities.

In this way, the distribution area evaluation part 74 extracts, from the distribution information management table 72, the terminal direction information at the time of distribution and the visit information on an advertisement ID and area ID at the time of distribution basis, and writes, sequentially in the distribution trend management table 75, the number of distributions of advertisements, the number of visits and the direction visit probabilities, all of which are calculated on the basis of the extracted terminal direction information at the time of distribution and visit information. Here, the number of distributions of advertisements, the number of visits and the direction visit probabilities form the visit trend information.

In the visit trend management table 75, the visit trend information written by the distribution area evaluation part 74 is recoded. FIG. 25 is a diagram illustrating one example of data recorded in the visit trend management table 75. As illustrated in FIG. 25, in the visit trend management table 75, advertisement IDs, area IDs, the number of distributions of advertisements (area), the number of visits (area), area visit probabilities, directions, the number of distributions of advertisements (direction), the number of visits (direction) and direction visit probabilities are recorded.

For example, the visit trend management table 75 illustrated in FIG. 25 provides that a total of distributions of the advertising information with the advertisement ID "A0001" to the mobile terminals 5 located within an area with the area ID "M0002" and traveling in the "north" is "30" (the number of distributions of advertisements (direction)) and of the "30" users of the mobile terminals 5 who have received the advertisement, the number of those who have actually visited the establishment indicated by the advertising information with the advertisement ID "A0001" is 15 (the number of visits (direction)). That is, as illustrated in FIG. 25, the direction visit probability in this case can be expressed as follows; the number of visits (direction) "15"/the number of distributions of advertisements (direction) "30"=50.0%.

In addition to the functions of the distribution area updating part 47 illustrated in FIG. 2, the distribution area updating part 76 has the following function. That is, the distribution area updating part 76 updates the distribution direction information recorded in the distribution area management table 67 such that the advertising information is distributed only to the mobile terminals 5 traveling in the directions whose direction visit probability is equal to or larger than a threshold value in the areas whose area visit probability is equal to or larger than a threshold value. Consequently, the information distribution part 70 can distribute the advertising information only to the mobile terminals 5 located within the areas whose area visit probability is equal to or larger than a threshold value and traveling in the directions whose direction visit probability is equal to or larger than a threshold value in the areas. The threshold value of the direction visit probability is pre-recorded in a memory (not illustrated) of the information distribution device 6.

Although a description has been given in the above of an example where the uniform threshold value is set for each direction visit probability, the present invention is not limited to this example. For example, the threshold value of the direction visit probability may be set on an area or direction basis. Further, the threshold value of the area visit evaluation value and that of the direction visit evaluation value may be the same or be different from each other.

(Exemplary Operations of Distribution System)

Next, the operations of the distribution system 10 according to the above-described configuration will be described with reference to FIGS. 26 to 28.

Figure 26:
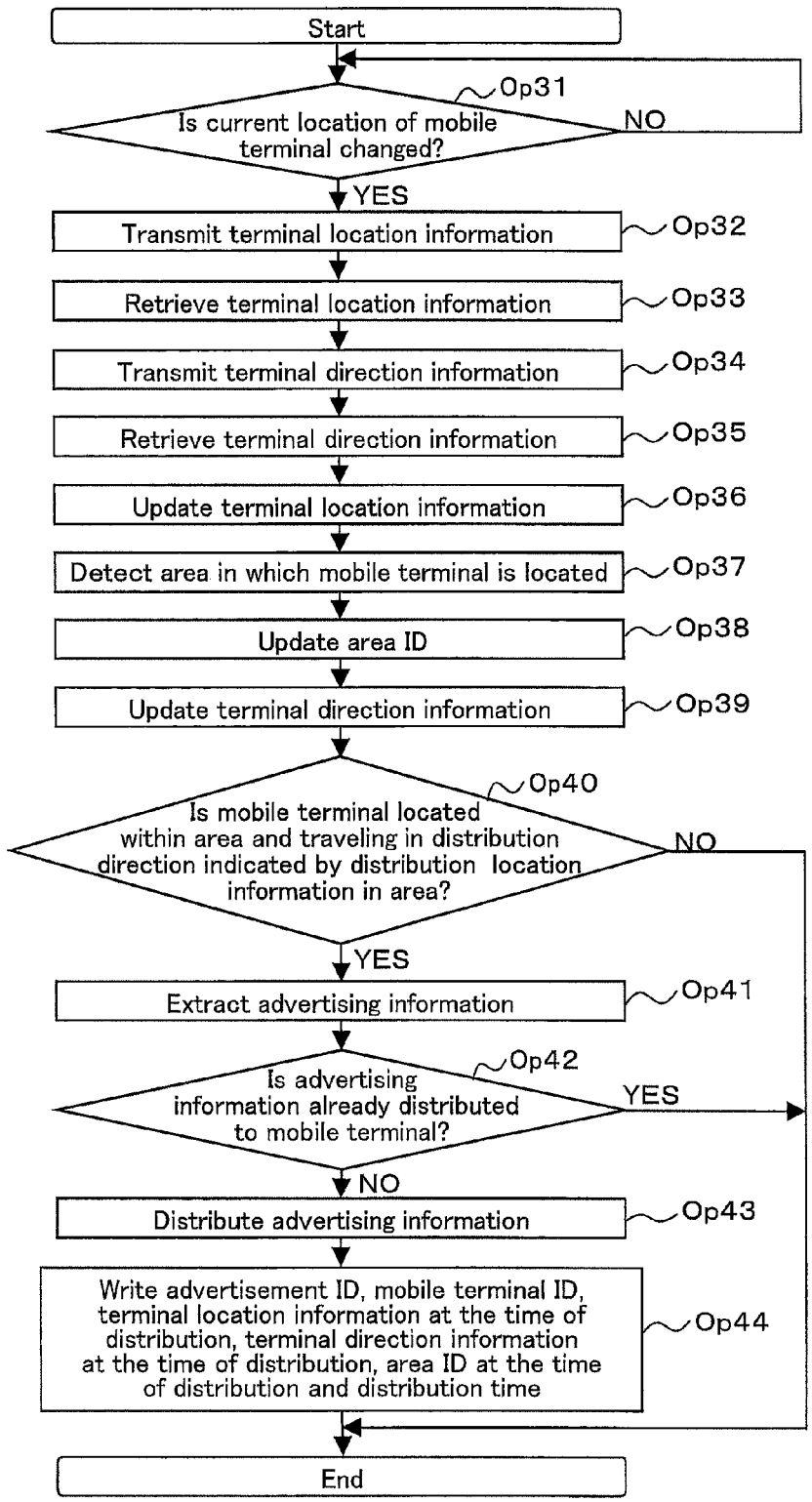
FIG. 26 is a flowchart illustrating an exemplary operation of the distribution system when the information distribution device distributes the advertising information to mobile terminals.

FIG. 26 is a flowchart illustrating an exemplary operation of the distribution system 10 when the information distribution device 6 distributes the advertising information to the mobile terminal 5. As illustrated in FIG. 26, the distribution system 10 carries out the processes of Op31 to Op33. Since the processes of Op31 to Op33 illustrated in FIG. 26 are the same as the processes of Op1 to Op3 illustrated in FIG. 15, the description thereof will not be repeated.

Thereafter, the terminal direction measurement part 53 generates terminal direction information indicating the direction in which the mobile terminal 5 travels and outputs the generated terminal direction information to the terminal direction transmission part 54. The terminal direction transmission part 54 transmits, via the network N, the terminal direction information outputted from the terminal direction measurement part 53 to the information distribution device 6 (Op34).

Next, the terminal direction retrieving part 63 of the information distribution device 6 retrieves, via the network N, the terminal direction information transmitted at Op34 (Op35). Then, the information distribution device 6 carries out the processes of Op36 to Op38. Since the processes of Op36 to Op38 illustrated in FIG. 26 are the same as the processes of Op4 to Op6 illustrated in FIG. 15, the description thereof will not be repeated. And then, the terminal location updating part 65 updates the terminal direction information recorded in the terminal location management table 64 to the terminal direction information retrieved at Op35 (Op39).

Subsequently, the advertising information extraction part 68 determines whether or not the mobile terminal 5 is located within any of a plurality of areas forming the distribution area and is traveling in any of the distribution directions indicated by the distribution direction information (Op40). When it is found that the mobile terminal 5 is located within any of the plurality of areas and is traveling in any of the distribution directions indicated by the distribution direction information (YES at Op40), the advertising information extraction part 68 extracts the advertising information from the advertising information management table 66 on the basis of the advertisement ID indicated by the distribution area information (Op41). On the other hand, when the advertising information extraction part 68 determines that the mobile terminal 5 is located within any of the plurality of areas but is traveling in none of the distribution directions indicated by the distribution direction information (NO at Op40), the processing of FIG. 26 is ended.

Next, the information distribution part 70 determines whether or not the advertising information extracted at Op41 has already been distributed to the mobile terminal 5 (Op42). When the information distribution part 70 determines that the advertising information extracted at Op41 has already been distributed to the mobile terminal 5 (YES at Op42), the processing of FIG. 26 is ended. On the other hand, when it is found that the advertising information extracted at Op41 is yet to be distributed to the mobile terminal 5 (NO at Op42), the information distribution part 70 distributes the advertising information to the mobile terminal 5 (Op43). As a result, the advertising information distributed at Op43 is outputted from the voice output part 56 of the mobile terminal 5 in voice.

Then, the information distribution part 70 writes, in the distribution information management table 72, the advertisement ID, the mobile terminal ID, the terminal location information at the time of distribution, the terminal direction information at the time of distribution, the area ID at the time of distribution and the distribution time (Op44).

Figure 27:
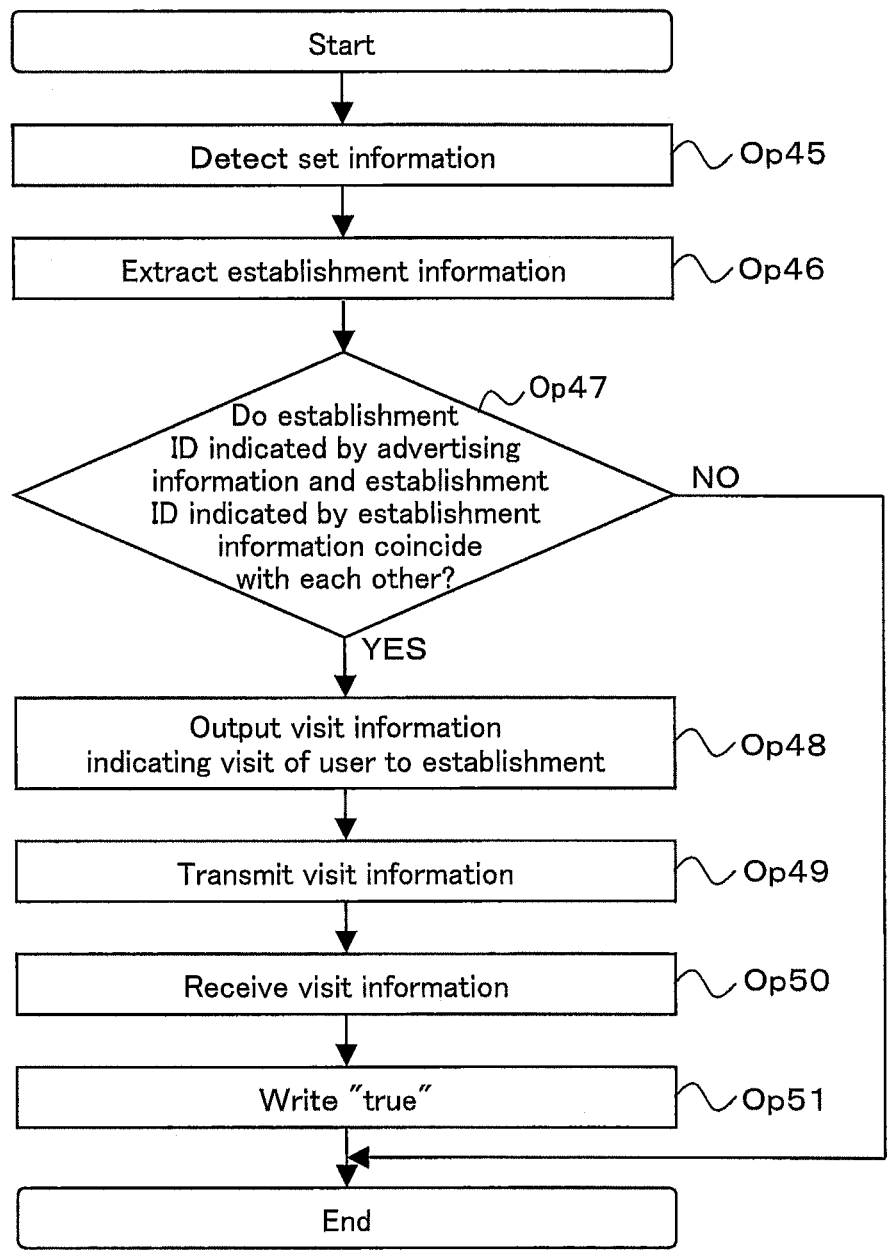
FIG. 27 is a flowchart illustrating an exemplary operation of the distribution system when determining whether or not a user of a mobile terminal has visited an establishment indicated by the advertising information distributed by the information distribution device.

FIG. 27 is a flowchart illustrating an exemplary operation of the distribution system 10 when determining whether or not the user of the mobile terminal 5 has visited an establishment indicated by the advertising information distributed by the information distribution device 6. As illustrated in FIG. 27, when the user of the mobile terminal 5 sets a desired establishment as the destination or a stopping point, the set information detection part 58 detects the set establishment as set information (Op45). On the basis of the set information detected at Op45, the set information detection part 58 extracts the establishment information from the establishment information management table 57 (Op46).

Then, the visit determination part 59 determines whether or not the establishment ID indicated by the advertising information outputted from the advertising information reception part 55 and the establishment ID indicated by the establishment information extracted at Op46 coincide with each other (Op47). When it is found that the establishment ID indicated by the advertising information and the establishment ID indicated by the establishment information extracted at Op46 coincide with each other (YES at Op47), the visit determination part 59 determines that the user of the mobile terminal 5 has visited the establishment indicated by the advertising information. In this case, the visit determination part 59 outputs visit information indicating that the user of the mobile terminal 5 has visited the establishment indicated by the advertising information to the visit information transmission part 60 (Op48). On the other hand, when the visit determination part 59 determines that the establishment ID indicated by the advertising information and the establishment ID indicated by the establishment information extracted at Op46 do not coincide with each other (NO at Op47), the processing of FIG. 27 is ended.

And then, the visit information transmission part 60 transmits, via the network N, the visit information outputted at Op48 to the information distribution device 6 (Op49).

Next, the visit reception part 71 of the information distribution device 6 receives, via the network N, the visit information transmitted at Op49 (Op50). Subsequently, on the basis of the visit information received at Op50, the visit management part 73 writes "true" in the column "presence or absence of visits" of the distribution information management table 72 (Op51).

The process in which the visit management part 73 writes "false" in the column "presence or absence of visits" of the distribution information management table 72 is the same as the process illustrated in FIG. 17. Thus, the description thereof will not be repeated.

Figure 28:
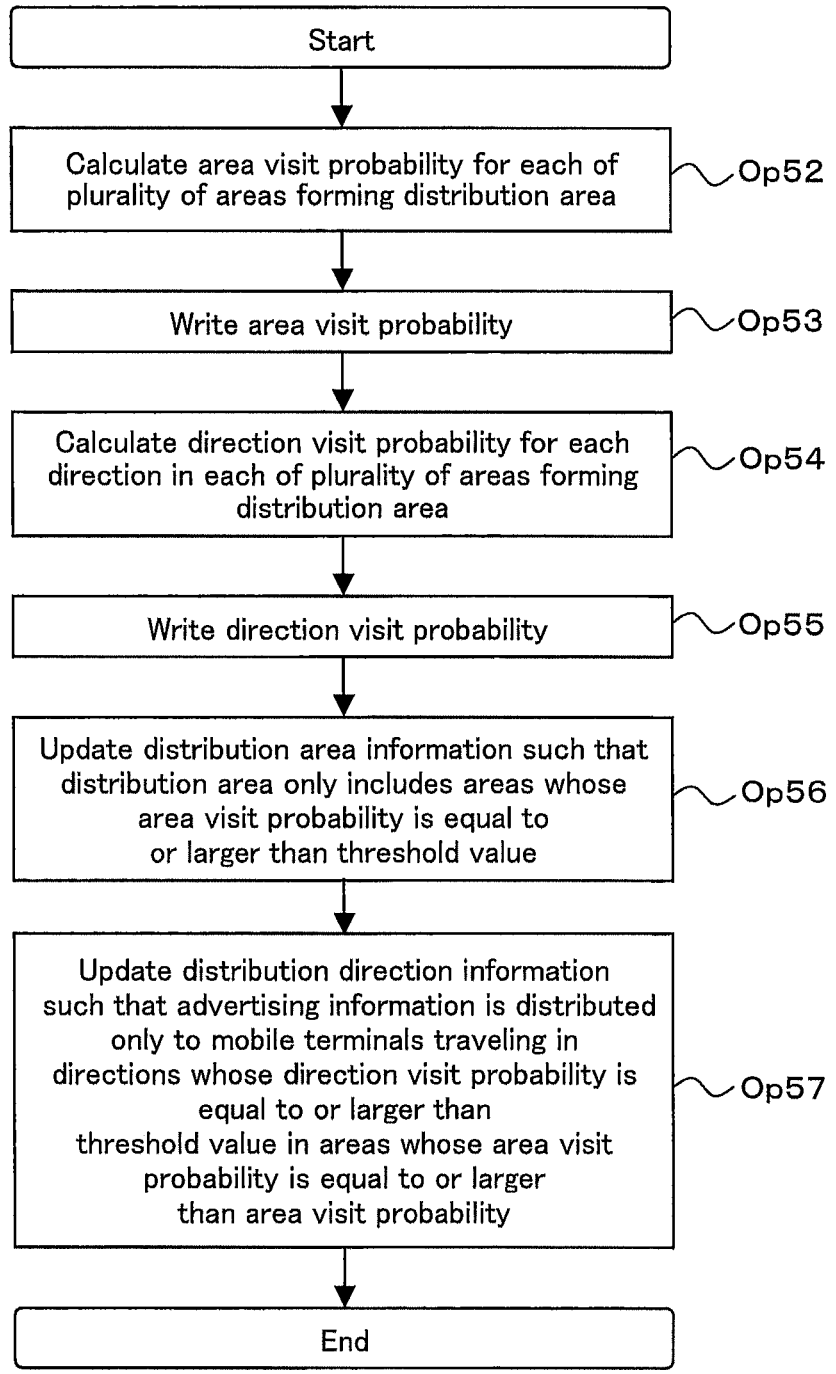
FIG. 28 is a flowchart illustrating an exemplary operation of the information distribution device when updating distribution area information and distribution direction information.

FIG. 28 is a flowchart illustrating an exemplary operation of the information distribution device 6 when updating the distribution area information and the distribution direction information. As illustrated in FIG. 28, the distribution area evaluation part 74 carries out the processes of Op52 and Op53. Since the processes of Op52 and Op53 illustrated in FIG. 28 are the same as the processes of Op22 and Op23 illustrated in FIG. 18, the description thereof will not be repeated.

Then, the distribution area evaluation part 71 calculates, for each of a plurality of predetermined directions in each of a plurality of areas forming the distribution area, the direction visit probability indicating, of the users of the mobile terminals 5 who have been traveling in any one of the plurality of directions in any one of the plurality of areas forming the distribution area when the advertising information is distributed from the information distribution part 70, a percentage of those who have visited the establishment indicated by the advertising information distributed to the mobile terminals 5 (Op54). The distribution area evaluation part 74 writes the direction visit probabilities calculated at Op54 in the visit trend management table 75 (Op55).

Subsequently, the distribution area updating part 76 carries out the process of Op56. Since the process of Op56 illustrated in FIG. 28 is the same as the process of Op24 illustrated in FIG. 18, the description thereof will not be repeated. Then, the distribution area updating part 76 updates the distribution direction information recorded in the distribution area management table 67 such that the advertising information is distributed only to the mobile terminals 5 traveling in the directions whose direction visit probability is equal to or larger than the threshold value in the areas whose area visit probability is equal to or larger than the threshold value (Op57). Consequently, the information distribution part 70 can distribute the advertising information only to the mobile terminals 5 located in the areas whose area visit probability is equal to or larger than the threshold value and traveling in the directions whose direction visit probability is equal to or larger than the threshold value in the areas.

As described above, according to the distribution system 10 of the present embodiment, the advertising information is not distributed to the mobile terminals 5 traveling in the directions whose direction visit probability is less than the threshold value even if they are in the areas whose area visit probability is equal to or larger than the threshold value. In other words, the information distribution part 70 can distribute the advertising information only to the mobile terminals 5 traveling in the directions whose direction visit probability is equal to or larger than the threshold value in the areas whose area visit probability is equal to or larger than the threshold value. As a result, the information distribution device 6 according to the present embodiment further can reduced the number of distributions of the advertising information unnecessary to the users of the mobile terminals 5 as compared with the information distribution device 3 according to Embodiment 1.

Note that the embodiment described above is one specific example of embodiments of the present invention and a variety of modifications can be made. Hereinafter, a major modified example will be described.

[Modified Example]

In the embodiment described above, a description has been given of an example where the distribution area updating part 76 updates the distribution direction information recorded in the distribution area management table 67 such that the advertising information is distributed only to the mobile terminals 5 traveling in the directions whose direction visit probability is equal to or larger than the threshold value (hereinafter referred to as the target directions) in the areas whose area visit probability is equal to or larger than the threshold value (hereinafter referred to as the target areas). However, it is likely that, of areas that are in the vicinity of the target areas and are in the directions opposite to the target directions in the target areas, those whose area visit probability is not calculated by the distribution area evaluation part 74 (i.e., unevaluated areas) also have an area visit probability equal to or larger than the threshold value. Thus, in addition to the functions of the distribution area updating part 76 according to the embodiment described above, the distribution area updating part 76 according to this modified example has the following function. That is, the distribution area updating part 76 according to this modified example updates the distribution area information recorded in the distribution area management table 67 such that the distribution area also includes, of areas that are in the vicinity of the target areas and are in the directions opposite to the target directions in the target areas, those whose area visit probability is not calculated by the distribution area evaluation part 74.

As illustrated in FIG. 29, it is assumed that, as an example, nine areas, i.e., areas $E_2$, $E_3$, $E_4$, $E_6$, $E_7$, $E_8$, $E_{10}$, $E_{11}$ and $E_{12}$, form a distribution area H. In this case, it is assumed that the target areas are three areas, the areas $E_6$, $E_{10}$ and $E_{11}$. It is also assumed that the target direction in the area $E_6$ is the south (the direction of an arrow $A_1$ in FIG. 29), the target directions in the area $E_{10}$ are the east, the southeast and the south (the direction of an arrow $A_2$, the direction of and arrow $A_3$ and the direction of an arrow $A_4$ in FIG. 29, respectively) and the target direction in the area $E_{11}$ is the east (the direction of an arrow $A_5$ in FIG. 29). Thus, of areas that are in the vicinity of the target areas and are in the directions opposite to the target directions in the target areas, those whose area visit probability is not calculated by the distribution area evaluation part 74 are five areas, areas $E_5$, $E_9$, $E_{13}$, $E_{14}$ and $E_{15}$. In this modified example, although the areas in the vicinity of the target areas refer to those situated one square next to the target areas (including diagonal direction), they are not limited to this example.

In such a case, the distribution area updating part 76 updates the distribution area information recorded in the distribution area management table 67 such that the distribution area only includes eight areas, i.e., the areas $E_5$, $E_6$, $E_9$, $E_{10}$, $E_{11}$, $E_{13}$, $E_{14}$ and $E_{15}$. Consequently, the information distribution part 70 can distribute the advertising information also to the mobile terminals located within the areas that are in the vicinity of the target areas and are in the directions opposite to the target directions in the target areas.

Although a description has been given in Embodiments 1 and 2 of an example where the information distribution device distributes the advertising information indicating advertisements for products in which establishments deal to the mobile terminals, the present invention is not limited to this example. For example, the information distribution device may distribute popularity information (word-of-mouth information) indicating the popularity of an establishment to the mobile terminals. The information distribution device may also distribute event information indicating details on an event that takes place at some place (location) to the mobile terminals. In other words, as long as the information distribution device can distribute notification information regarding a predetermined location to the mobile terminals, the types of notification information are not limited to the advertising information, popularity information and event information described above.

Although a description has been given in Embodiment 2 of an example where whether to distribute the advertising information or not is determined in accordance with the directions in which the mobile terminals travel, the present invention is not limited to this example. For example, whether to distribute the advertising information or not may be determined in accordance with the speed at which each of the mobile terminals travels. In other words, whether to distribute the advertising information or not is determined in accordance with whether the user of the mobile terminal in the distribution area is traveling by car (or train) or on foot. Whether to distribute the advertising information or not also may be determined in accordance with the direction in which and the speed at which each of the mobile terminals travels.

Further, a description has been given in Embodiment 1 of an example where the visit determination part determines that the user of the mobile terminal has visited an establishment when the current location of the mobile terminal indicates that it has been within the location range of the establishment for a duration equal to or larger than the stay determination time. Further, a description has been given in Embodiment 2 of an example where when the user of the mobile terminal who has received the advertising information sets an establishment indicated by the advertising information as the destination or a stopping point, the visit determination part determines that the user of the mobile terminal has visited the establishment. However, the present invention is not limited only to these configurations. For example, the visit determination part may determine that the user of the mobile terminal has visited the establishment when the user of the mobile terminal purchases a product sold at the establishment with his/her mobile terminal. Further, the visit determination part may determine that the user of the mobile terminal has visited a gas station (establishment) when an increase in the fuel of the mobile unit is detected.

Further, although a description has been given in Embodiments 1 and 2 of an example where each data is recorded in each table, the present invention is not limited to this example. That is, as long as data can be recorded in the recording parts, the recording parts are not limited to tables.

As described above, the present invention is useful as an information distribution device, an information distribution method or a program capable of reducing the number of distributions of notification information unnecessary to the users of mobile terminals.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although Embodiments 1 and 2 of the present invention have been described in detail, it should be understood that the various changes, substitutions, and alterations could be made hereto without departing from the spirit and scope of the invention.

What is claimed is:

1. An information distribution device comprising:
   a processor and a memory coupled to the processor that implement following parts:
   a terminal location retrieving part that retrieves terminal location information indicating current locations of mobile terminals;
   a notification information recording part in which notification information regarding a predetermined location is pre-recorded;
   a distribution area recording part in which distribution area information indicating a distribution area formed of a plurality of areas is recorded;
   an information distribution part that distributes the notification information to, of the mobile terminals, those located within the distribution area;
   a distribution information recording part in which terminal location area information indicating each area in which each of the mobile terminals is located when the notification information is distributed from the information distribution part to each of the mobile terminals is recorded;

a distribution area evaluation part that calculates, for each of the plurality of areas forming the distribution area and based on the terminal location area information, an area visit evaluation value indicating a ratio of visiting users who have visited the location indicated by the notification information which have been distributed to mobile terminals of the visiting users to notified users of mobile terminals to which the notification information have been distributed in any of the plurality of areas forming the distribution area; and a distribution area updating part that updates the distribution area information recorded in the distribution area recording part such that the distribution area only includes, of the plurality areas, those whose area visit evaluation value is equal to or larger than a threshold value.

2. The information distribution device according to claim 1, wherein the information distribution part distributes the notification information further to mobile terminals in another area whose area visit evaluation value is not calculated by the distribution area evaluation part, the another area being adjacent to the areas whose area visit evaluation value is equal to or larger than the threshold value.

3. The information distribution device according to claim 1, wherein the processor and the memory further implements a terminal direction retrieving part that retrieves terminal direction information indicating directions in which the mobile terminals travel, wherein distribution direction information indicating traveling directions of mobile terminals to which the notification information is to be distributed is recorded in the distribution area recording part for each of the plurality of areas forming the distribution area, the information distribution part distributes the notification information to, of the mobile terminals, those located within any of the plurality of areas forming the distribution area and traveling in the directions indicated by the distribution direction information, the distribution information recording part further records terminal traveling direction information obtained from the terminal direction information and indicating each direction in which each of the mobile terminals travels when the notification information is distributed from the information distribution part, the distribution area evaluation part calculates, for each of a plurality of predetermined directions in each of the plurality of areas forming the distribution area and based on the terminal traveling direction information, a direction visit evaluation value indicating, a ratio of the visiting users who have visited the location indicated by the notification information which have been distributed to mobile terminals of the visiting users to the notified users of mobile terminals which have been traveling the in any one of the plurality of directions in any one of the plurality of areas when the notification information is distributed from the information distribution part, and the distribution area updating part updates the distribution direction information recorded in the distribution area recording part such that the notification information is distributed only to the mobile terminals traveling in, of the plurality of directions, those whose direction visit probability is equal to or larger than a threshold value in the areas whose area visit probability is equal to or larger than the threshold value.

4. The information distribution device according to claim 3, wherein the information distribution part distributes the notification information further to mobile terminals in another areas whose area visit evaluation value is not calculated by the distribution area evaluation part, the another area being adjacent to the areas whose area visit evaluation value is equal to or larger than the threshold value and being in directions opposite to the directions whose visit direction probability is equal to or larger than the threshold value in the areas whose area visit evaluation value is equal to or larger than the threshold value.

5. An information distribution method executed by a computer accessible to a notification information recording part in which notification information regarding a predetermined location is pre-recorded and a distribution area recording part in which distribution area information indicating a distribution area formed of a plurality of areas is recorded, the information distribution method comprising:

retrieving, by a terminal location retrieving part included in the computer, terminal location information indicating current locations of mobile terminals;

distributing, by an information distribution part included in the computer, the notification information to, of the mobile terminals, those located within the distribution area;

calculating, by a distribution area evaluation part included in the computer and for each of the plurality of areas forming the distribution area, an area visit evaluation value indicating a ratio of visiting users who have visited the location indicated by the notification information which have been distributed to mobile terminals of the visiting users to notified users of mobile terminals to which the notification information have been distributed in any of the plurality of areas forming the distribution area, based on terminal location area information indicating areas in which each of the mobile terminals is located when the notification information is distributed and recorded in a distribution information recording part; and updating, by a distribution area updating part included in the computer, the distribution area information recorded in the distribution area recording part such that the distribution area only includes, of the plurality areas, those whose area visit evaluation value is equal to or larger than a threshold value.

6. A non-transitory recording medium storing a program for causing a computer accessible to a notification information recording part in which notification information regarding a predetermined location is pre-recorded and a distribution area recording part in which distribution area information indicating a distribution area formed of a plurality of areas is recorded to perform processing of:

retrieving terminal location information indicating current locations of mobile terminals;

distributing the notification information to, of the mobile terminals, those located within the distribution area;

calculating, for each of the plurality of areas forming the distribution area, an area visit evaluation value indicating a ratio of visiting users who have visited the location indicated by the notification information which have been distributed to mobile terminals of the visiting users to notified users of mobile terminals to which the notification information is distributed in any of the plurality of areas forming the distribution area, based on terminal location area information indicating areas in which each of the mobile terminals is located when the notification information is distributed and recorded in a distribution information recording part; and updating the distribution area information recorded in the distribution area recording part such that the distribution area only includes, of the plurality areas, those whose area visit evaluation value is equal to or larger than a threshold value.

* * * * *

UNITED STATES PATENT AND TRADEMARK OFFICE
CERTIFICATE OF CORRECTION

| | | |
|---|---|---|
| PATENT NO. | : 8,566,162 B2 | Page 1 of 1 |
| APPLICATION NO. | : 12/895180 | |
| DATED | : October 22, 2013 | |
| INVENTOR(S) | : Masayuki Fukui et al. | |

It is certified that error appears in the above-identified patent and that said Letters Patent is hereby corrected as shown below:

In the Claims
In Column 35, Line 47, In Claim 3, delete "indicating, a ratio" and insert -- indicating a ratio --, therefor.
In Column 35, Line 51, In Claim 3, delete "traveling the" and insert -- traveling --, therefor.

Signed and Sealed this
Twenty-eighth Day of January, 2014

Michelle K. Lee
*Deputy Director of the United States Patent and Trademark Office*